United States Patent
Yoshida et al.

(10) Patent No.: US 10,446,890 B2
(45) Date of Patent: Oct. 15, 2019

(54) POWER STORAGE MODULE, POWER STORAGE SYSTEM, ELECTRONIC APPARATUS, ELECTRIC VEHICLE, AND POWER SYSTEM

(71) Applicant: Murata Manufacturing Co., Ltd., Kyoto (JP)

(72) Inventors: Naotake Yoshida, Fukushima (JP); Tsutomu Aoyama, Fukushima (JP); Tatsuya Adachi, Fukushima (JP); Hiroaki Ono, Miyagi (JP); Noritsugu Yoshizawa, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/540,388

(22) PCT Filed: Dec. 11, 2015

(86) PCT No.: PCT/JP2015/006182
§ 371 (c)(1),
(2) Date: Jun. 28, 2017

(87) PCT Pub. No.: WO2016/113798
PCT Pub. Date: Jul. 21, 2016

(65) Prior Publication Data
US 2017/0352931 A1    Dec. 7, 2017

(30) Foreign Application Priority Data
Jan. 16, 2015  (JP) ................................ 2015-007277

(51) Int. Cl.
*H01M 2/10* (2006.01)
*H01M 10/637* (2014.01)
(Continued)

(52) U.S. Cl.
CPC .......... *H01M 10/637* (2015.04); *H01M 2/10* (2013.01); *H01M 10/627* (2015.04);
(Continued)

(58) Field of Classification Search
CPC .................................................. H01M 10/637
(Continued)

(56) References Cited

U.S. PATENT DOCUMENTS

2007/0259258 A1* 11/2007 Buck .................... B29C 44/1233
429/120
2014/0045028 A1* 2/2014 Moon ............... H01M 10/5004
429/120
(Continued)

FOREIGN PATENT DOCUMENTS

JP        2009-118729 A      5/2009
JP        2009-123771 A      6/2009
(Continued)

OTHER PUBLICATIONS

International Search Report and Written Opinion of PCT Application No. PCT/JP2015/006182, dated Feb. 16, 2016, 03 pages of English Translation and 11 pages of ISRWO.

(Continued)

*Primary Examiner* — Suresh Memula
(74) *Attorney, Agent, or Firm* — Chip Law Group

(57) ABSTRACT

A power storage module includes: a battery block group including a plurality of battery cells; a connecting terminal portion joined to terminal surfaces of the plurality of battery cells; and a heat conductive material arranged in a manner contacting the connecting terminal portion. The heat conductive material includes at least any member of a plurality of interspersed members or a member having a clearance. The heat conductive materials are distributed more densely in a center portion of a region surrounded by an outermost (Continued)

peripheral edge of the battery block group than in peripheral portions surrounding the center portion in a plan view from a normal line direction of an arrangement surface of the heat conductive materials.

15 Claims, 25 Drawing Sheets

(51) Int. Cl.
| | |
|---|---|
| *H01M 10/6553* | (2014.01) |
| *H01M 10/653* | (2014.01) |
| *H01M 10/6556* | (2014.01) |
| *H01M 10/652* | (2014.01) |
| *H01M 10/643* | (2014.01) |
| *H01M 10/6554* | (2014.01) |
| *H01M 10/627* | (2014.01) |
| *H01M 10/6562* | (2014.01) |
| *H01M 10/625* | (2014.01) |
| *H01M 10/617* | (2014.01) |
| *H01M 10/613* | (2014.01) |

(52) U.S. Cl.
CPC ....... *H01M 10/643* (2015.04); *H01M 10/652* (2015.04); *H01M 10/653* (2015.04); *H01M 10/6553* (2015.04); *H01M 10/6554* (2015.04); *H01M 10/6556* (2015.04); *H01M 10/6562* (2015.04); *H01M 10/613* (2015.04); *H01M 10/617* (2015.04); *H01M 10/625* (2015.04)

(58) Field of Classification Search
USPC ....................................................... 320/134
See application file for complete search history.

(56) References Cited

U.S. PATENT DOCUMENTS

| | | | |
|---|---|---|---|
| 2015/0221996 A1* | 8/2015 | Jin | H01M 10/6556 |
| | | | 429/120 |
| 2017/0162923 A1* | 6/2017 | Deng | H01M 10/6568 |
| 2018/0062225 A1* | 3/2018 | You | H01M 10/6556 |

FOREIGN PATENT DOCUMENTS

| | | |
|---|---|---|
| JP | 2009-162993 A | 7/2009 |
| JP | 2010-097923 A | 4/2010 |
| JP | 2010-262842 A | 11/2010 |
| JP | 2011-119240 A | 6/2011 |
| JP | 2011-253641 A | 12/2011 |
| JP | 2012-094330 A | 5/2012 |
| JP | 2013-120690 A | 6/2013 |
| JP | 2014-135180 A | 7/2014 |
| WO | 2012/132135 A1 | 10/2012 |
| WO | 2014/035160 A1 | 3/2014 |

OTHER PUBLICATIONS

Office Action for CN Patent Application No. 201580072626.6, dated Nov. 2, 2018, 07 pages of Office Action and 08 pages of English Translation.
Extended European Search Report of EP Application No. 15877754.0, dated Jul. 13, 2018, 08 pages of EESR.
Office Action for JP Patent Application No. 2016-569129, dated Jan. 8, 2019, 06 pages of Office Action and 05 pages of English Translation.
Office Action for CN Patent Application No. 201580072626.6, dated Jun. 4, 2019, 05 pages of Office Action and 08 pages of English Translation.
Office Action for JP Patent Application No. 2016-569129, dated Aug. 20, 2019, 03 pages of Office Action and 03 pages of English Translation.

* cited by examiner

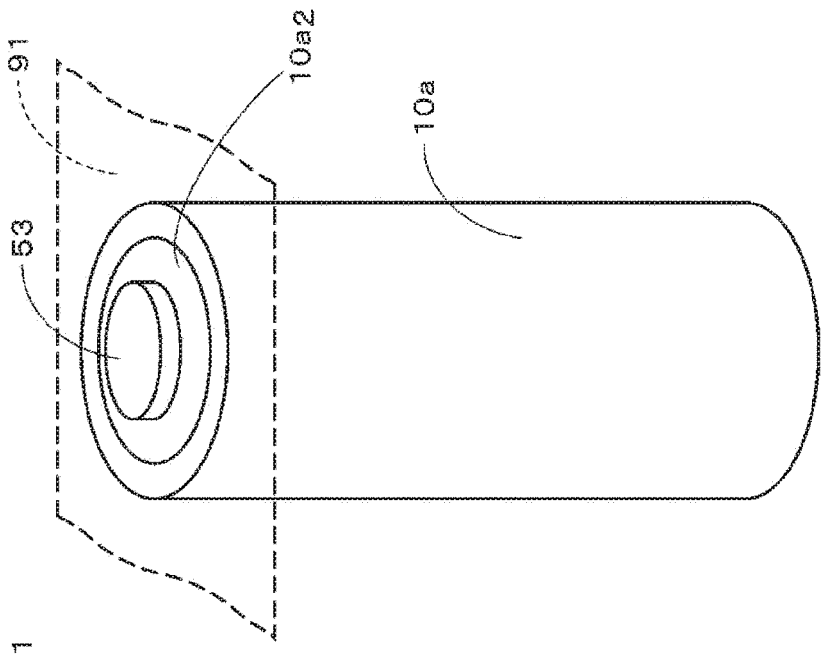
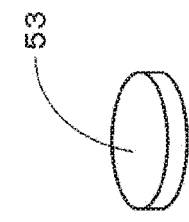
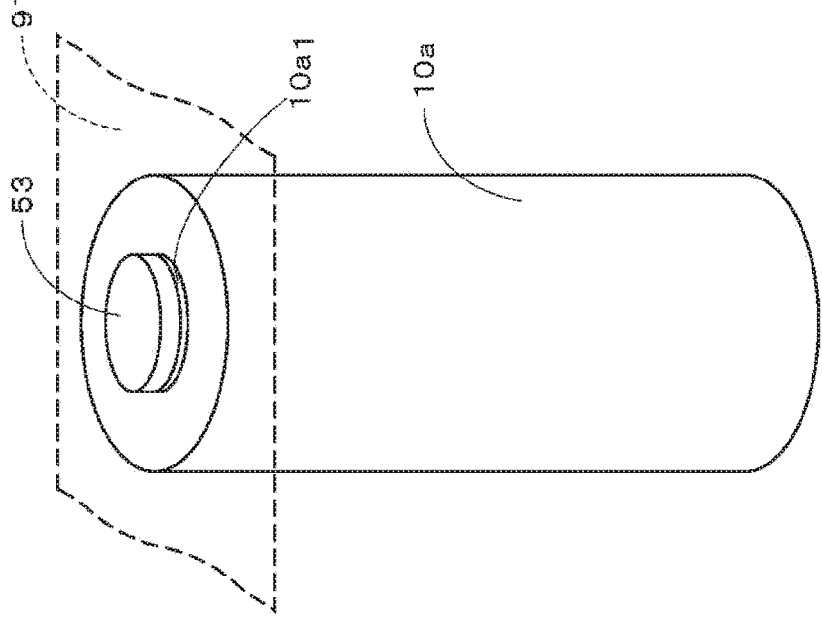

POWER STORAGE MODULE, POWER STORAGE SYSTEM, ELECTRONIC APPARATUS, ELECTRIC VEHICLE, AND POWER SYSTEM

CROSS REFERENCE TO RELATED APPLICATIONS

This application is a U.S. National Phase of International Patent Application No. PCT/JP2015/006182 filed on Dec. 11, 2015, which claims priority benefit of Japanese Patent Application No. JP 2015-007277 filed in the Japan Patent Office on Jan. 16, 2015. Each of the above-referenced applications is hereby incorporated herein by reference in its entirety.

TECHNICAL FIELD

The present technology relates to a power storage module, a power storage system, an electronic apparatus, an electric vehicle, and a power system.

BACKGROUND ART

In recent years, application of a secondary battery such as a lithium ion battery is rapidly increased in a power storage module for storing power, a storage battery for a car, and the like combined with a new energy system such as a solar cell or wind power generation. A battery system connected to one or more power storage modules is used in order to generate large output. The power storage module is formed by housing, in an outer case, one or more battery blocks which are battery packs, for example. The battery block is formed by connecting a plurality of unit batteries, namely, exemplary power storage elements (also referred to as electric cells or cells. In the following description, simply referred to as a battery cell as necessary).

Technologies related to a power storage module are disclosed in Patent Documents 1 to 5 below.

CITATION LIST

Patent Documents

Patent Document 1: Japanese Patent Application Laid-Open No. 2011-253641 A
Patent Document 2: Japanese Patent Application Laid-Open No. 2012-94330 A
Patent Document 3: International Patent Publication No. WO2012/132135 A1
Patent Document 4: Japanese Patent Application Laid-Open No. 2009-123771 A
Patent Document 5: Japanese Patent Application Laid-Open No. 2009-162993 A

SUMMARY OF THE INVENTION

Problems to be Solved by the Invention

A power storage module is requested to efficiently perform heat radiation of a battery pack.

Therefore, the present technology is directed to providing a power storage module, a power storage system, an electronic apparatus, an electric vehicle, and a power system capable of efficiently radiating heat of the battery pack.

Solutions to Problems

To solve the above-described problem, the present technology provides a power storage module including: a battery block group including plurality of battery cells; a connecting terminal portion joined to terminal surfaces of the plurality of battery cells; and a heat conductive material arranged on the connecting terminal portion in a contacting manner, in which the heat conductive material includes at least any member of a plurality of interspersed members or a member having a clearance, the heat conductive materials are distributed more densely in a center portion of a region surrounded by an outermost peripheral edge of the battery block group than in peripheral portions surrounding the center portion in a plan view from a normal line direction of an arrangement surface of the heat conductive materials.

The power storage system, electronic apparatus, electric vehicle, and power system of the present technology include the above-described power storage module.

Effects of the Invention

According to the present technology, heat of a battery pack can be efficiently radiated.

BRIEF DESCRIPTION OF DRAWINGS

FIG. 14A is a perspective view illustrating an exemplary structure of a heat conductive material. FIG. 14B is a perspective view illustrating a state in which the heat conductive material is arranged on a connecting terminal portion. FIG. 14C is a perspective view illustrating a state in which the heat conductive material is arranged on the connecting terminal portion.

MODE FOR CARRYING OUT THE INVENTION

In the following, embodiments of the present technology will be described with reference to the drawings. Note that the description will be provided in the following order. Note that a same or correspondent portion will be denoted by a same reference sign in all of the drawings in embodiments.

1. First Embodiment (Example of Power Storage Module)
2. Second Embodiment (Another Example of Power Storage Module)
3. Other Embodiments
4. Exemplary Application Note that the embodiments and the like described below are preferred specific examples of the present technology and the content of the present technology is not limited to these embodiments and the like. Further, note that the effects described in the present specification are merely examples and not intended to be limited and further not intended to deny presence of an effect different from the exemplified effects.

1. First Embodiment
(Exemplary Structure of Power Storage Module)

Figure 1:
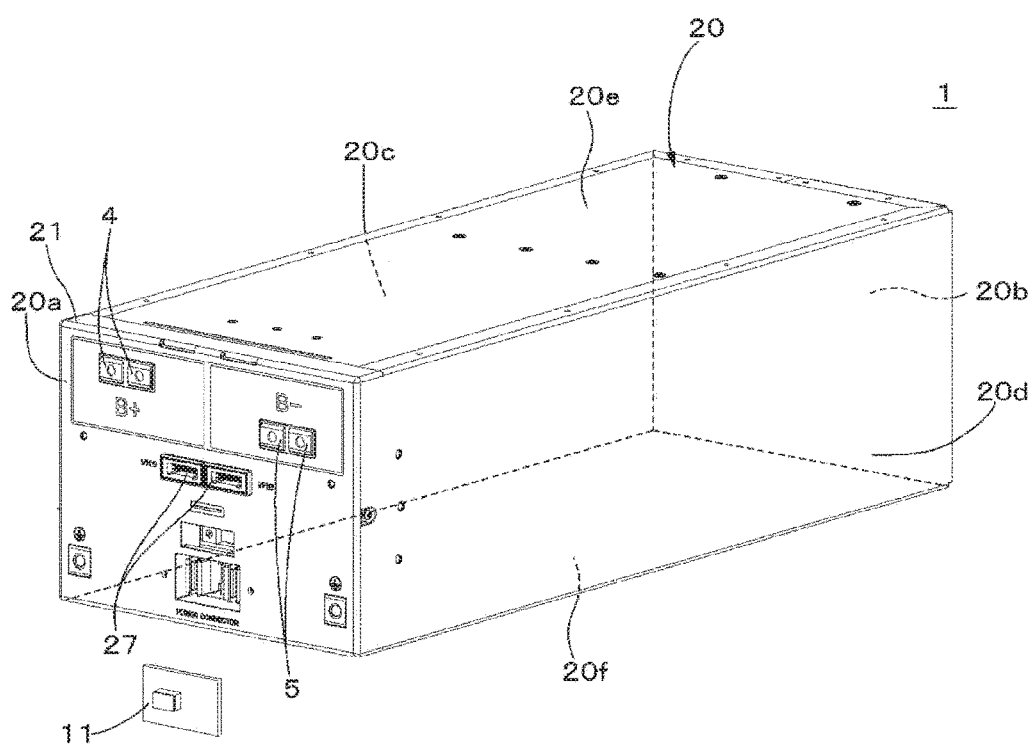
FIG. 1 is a perspective view illustrating an external view of a power storage module.
Figure 2:
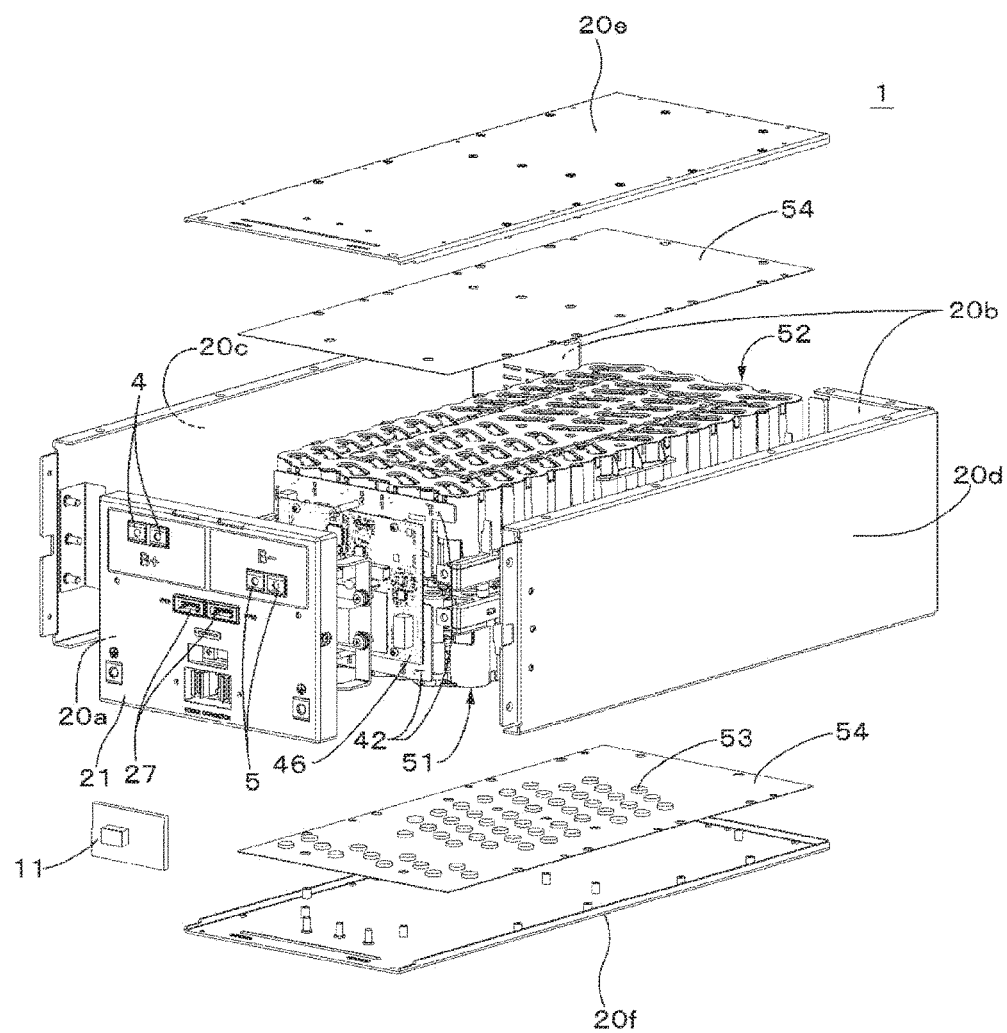
FIG. 2 is an exploded perspective view illustrating an exemplary structure of the power storage module.

An exemplary structure of a power storage module according to a first embodiment of the present technology will be described with reference to the drawings. FIG. 1 is a perspective view illustrating an external view of the power storage module. FIG. 2 is an exploded perspective view of the power storage module.

As illustrated in FIG. 1, a power storage module 1 includes an outer case 20. The outer case 20 is a housing having a substantially cuboid shape including a front surface portion 20a, a rear surface portion 20b facing the front surface portion, and four side surface portions including first to fourth side surface portions 20c to 20f connecting respective four sides of the front surface portion 20a and the rear surface portion 20b. The first side surface portion 20c and the second side surface portion 20d face each other, and the third side surface portion 20e and the fourth side surface portion f face each other.

For a material of the outer case 20, it is preferable to use a material having high heat conductivity and a radiation rate. In other words, it is preferable that a material having high heat conductivity and a radiation rate be used for the front surface portion 20a, rear surface portion 20b, and first to fourth side surface portions 20c to 20d. Consequently, the housing can achieve an excellent heat radiation property, and temperature increase inside the outer case 20 can be suppressed. For example, each of the front surface portion 20a, rear surface portion 20b, and four side surface portions 20c to 20d constituting the outer case 20 is formed of, for example, a plate-like body or a member processed in a plate-like body. The plate-like body is, for example, a metal plate of aluminum, an aluminum alloy, copper, a copper alloy, or the like.

The front surface portion 20a constituting the housing is covered with a protective cover 21. The protective cover 21 is formed of, for example, an insulating material such as resin having an insulating property. Since the front surface portion 20a is covered with the protective cover 21 formed of an insulating material having the insulating property, it is possible to ensure an insulation property between the front surface portion 20a and a connecting member, such as a bus bar, which electrically connects a plurality of power storage modules 1. Incidentally, the power storage module 1 can have surfaces other than the front surface portion 20a placed as a lower surface. In other words, the power storage module 1 can have the rear surface portion 20b, first side surface portion 20c, second side surface portion 20d, third side surface portion 20e, or fourth side surface portion 20f placed as a lower surface.

As illustrated in FIG. 2, a group of components including a battery unit 51, a battery unit 52, a sub-substrate 42, a main substrate 46, and the like, a heat conductive material 53, and an insulating material 54 are housed inside the outer case 20 of the power storage module 1.

The battery unit 51 and the insulating material 54 are fixed to an inner surface of the fourth side surface portion 20f of the outer case. The insulating material 54 is interposed between a lower surface of the battery unit 51 and the fourth side surface portion 20f of the outer case 20, and the heat conductive material 53 is interposed between the insulating material 54 and the lower surface of the battery unit 51. In a similar manner, the battery unit 52 and the insulating material 54 are fixed to an inner surface of the third side surface portion 20e of the outer case. The insulating material 54 is interposed between a lower surface of the battery unit 52 and the third side surface portion 20e, and the heat conductive material 53 is interposed between the insulating material 54 and the lower surface of the battery unit 52.

(Battery Unit)

The battery unit 51 and the battery unit 52 are vertically stacked in two stages and housed in the outer case 20 in a lateral arrangement state in which a bottom surface portion and an upper surface portion of a battery case 61 are oriented in the vertical direction. Incidentally, when the third side surface portion 20e or the fourth side surface portion 20f is placed as a lower surface, the battery units are horizontally stacked in two stages and housed in the outer case 20 in a vertical arrangement state in which the bottom surface portion and the upper surface portion of a battery case 61 are oriented in the horizontal direction.

Figure 3:
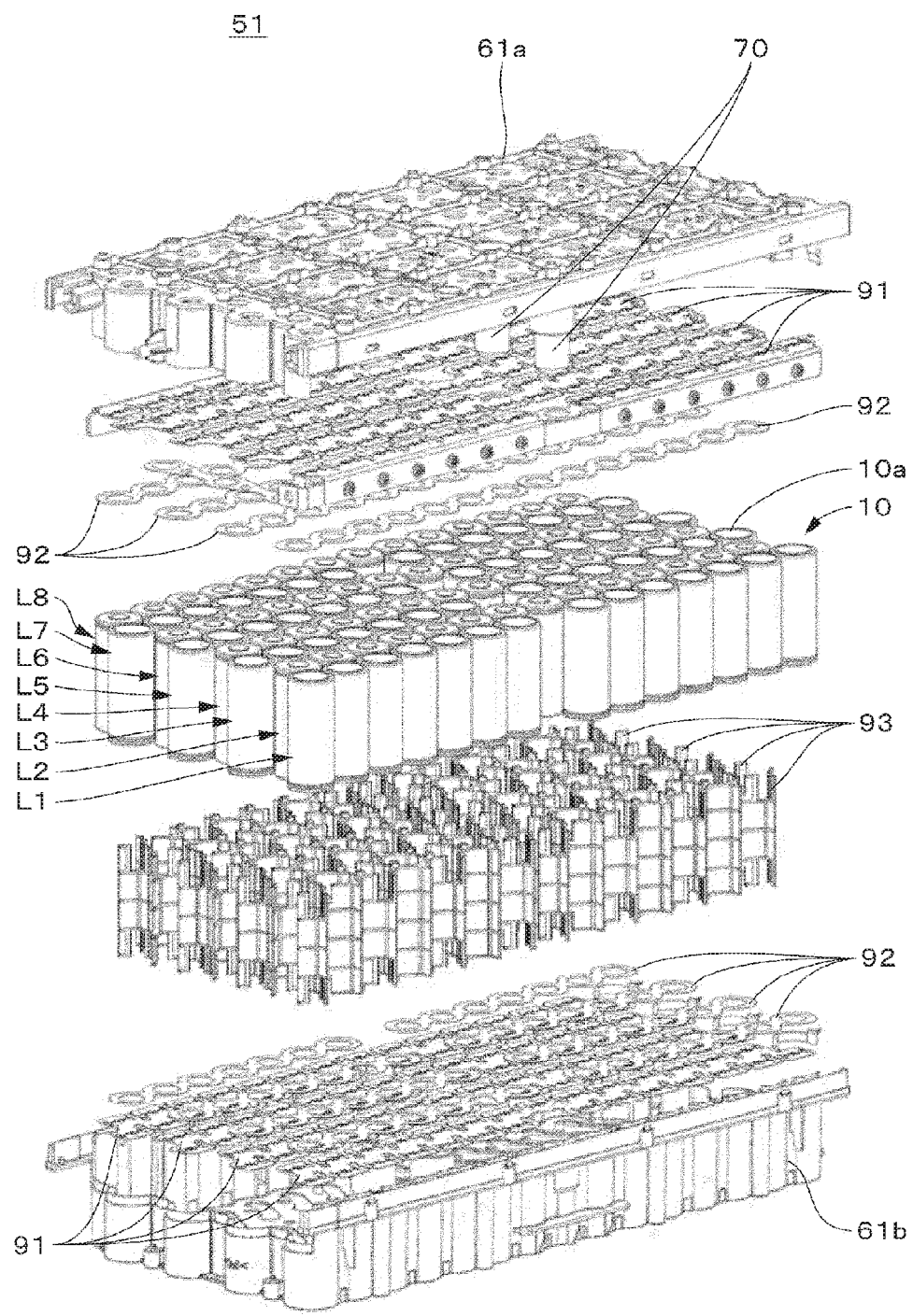
FIG. 3 is an exploded perspective view illustrating an exemplary structure of a battery unit.

FIG. 3 is an exploded perspective view illustrating an exemplary structure of a battery unit. The battery unit 51 is a unit that houses, in the battery case 61 including a top case 61a and a bottom case 61b: a battery block group 10 which is a battery pack including a plurality of battery cells 10a; partition plates 93 fitted between the plurality of battery cells 10a arranged in rows; connecting terminal portions 91 adapted to electrically connect the plurality of battery cells 10a; and a positive insulation sheet 92. Note that the battery unit 52 has a structure similar to the structure of the battery unit 51. Therefore, the structure of the battery unit 51 will be described below in detail, and a detailed description for the structure of the battery unit 52 will be omitted.

(Battery Case)

The battery case 61 is formed of the top case 61*a* and the bottom case 61*b*. The battery case 61 is, for example, a resin molded object formed of a resin having an electric insulating property.

(Top Case)

Figure 4:
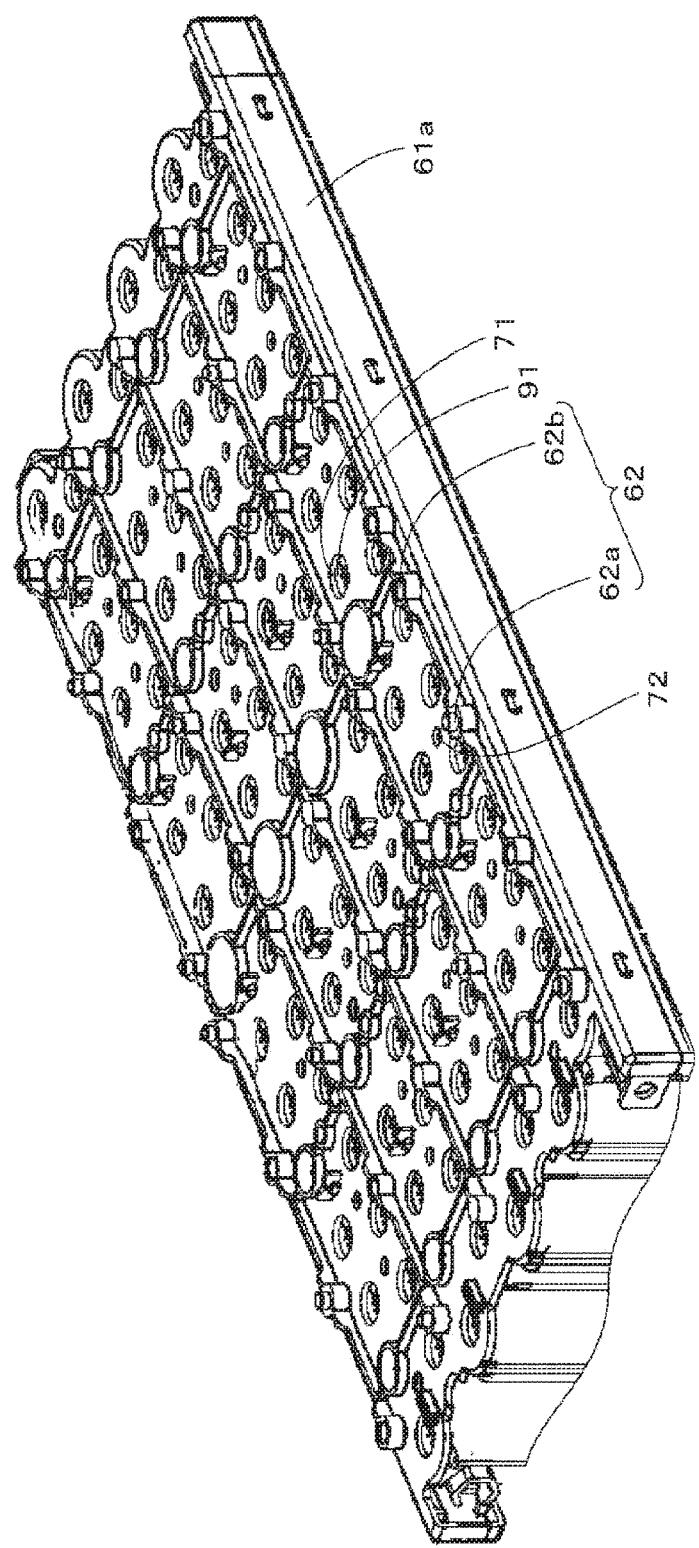
FIG. 4 is an exploded perspective view illustrating an exemplary structure of a top case.

FIG. 4 is a perspective view illustrating an exemplary structure of the top case 61*a*. The top case 61*a* includes an upper surface portion and wall portions erected in the periphery of the upper surface portion. The upper surface portion of the top case 61*a* is provided with a plurality of openings 71 exposing the connecting terminal portions 91 arranged on terminal surfaces of the plurality of battery cells 10*a*.

Additionally, the upper surface portion of the top case 61*a* is provided with a plurality of holes 72 in which projecting portions 93*a* of the partition plates 93 described later are fitted. Additionally, a fitting portion 62 is provided in a protruding manner on the upper surface portion of the top case 61*a*. The fitting portion 62 is formed of, for example, a fitting portion 62*a* having a projecting shape and a fitting portion 62*b* having a recessed shape. Since a plurality of fitting portions 62 is provided in protruding manner, a gap can be formed between the battery unit 51 and battery unit 52 facing each other, and additionally, the gap can be stably kept between the battery unit 51 and the battery unit 52 in a coupled state. Incidentally, although not illustrated, the upper surface portion of the top case 61*a* may also be provided with a thermistor insertion hole.

(Bottom Case)

The bottom case 61*b* includes a bottom surface portion and wall portions erected in the periphery of this bottom surface portion. Incidentally, although not illustrated, a center of the bottom surface portion is provided with four hollow structural bodies arranged in a row, and the structural bodies are fitted to hollow structural bodies 70 of the top case 61*a* in a state coupled to the top case 61*a*. The hollow structural body of the bottom case 61*b* is, for example, a hollow structural body and also a structural body having a hollow cylindrical shape having an upper surface opened and a lower surface including a hole in the center. Incidentally, the hole is fitted with a projecting portion provided on the fourth side surface portion 20*f* and fastened with a screw or the like as needed, and thus the battery unit 51 is fixed to the fourth side surface portion 20*f*. Although not illustrated, the bottom surface portion of the bottom case 61*b* is provided with a plurality of openings 71 exposing connecting terminal portions 91*b* in a manner similar to the upper surface portion of the top case 61*a*. Additionally, the bottom surface portion of the bottom case 61*b* is provided with a plurality of holes 72 in which the projecting portions 93*a* of the partition plates 93 described later are fitted.

Figure 5:
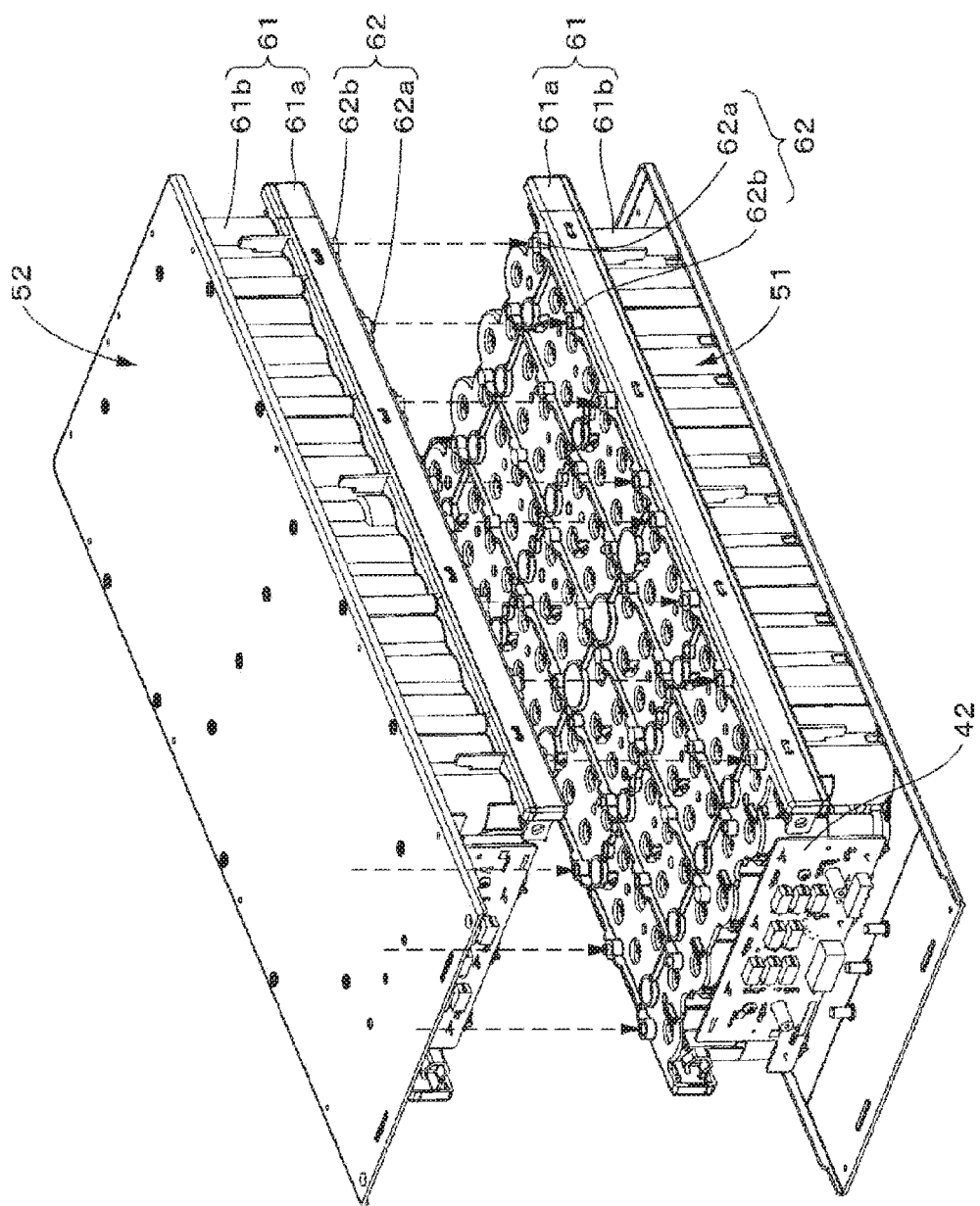
FIG. 5 is a perspective view illustrating a state before coupling two battery units.

FIG. 5 is a perspective view illustrating a state before coupling the two battery units. As illustrated in FIG. 5, when the battery unit 51 is coupled with the battery unit 52, the upper surface portion of the top case 61*a* of the battery unit 51 faces the upper surface portion of the top case 61*a* of the battery unit 52, and a corresponding fitting portion 62 provided in a projecting manner on the upper surface portion on one side is fitted with a fitting portion 62 provided in a projecting manner on the upper surface portion on the other side.

(Battery Block Group)

Referring back to FIG. 3, the battery block group 10 has a structure in which battery rows each including a plurality of battery cells 10*a* arranged linearly are arranged side by side in a direction substantially orthogonal to a row direction of the battery rows. Each of the battery rows is formed of, for example, fourteen batteries.

A battery block group 10 is a battery pack in which a plurality of battery cells 10*a* is electrically connected. The plurality of battery cells 10*a* constituting the battery block group 10 is electrically connected by connecting terminal portions 91. The battery block group 10 is formed of, for example, a plurality of battery blocks connected in series, and one battery block is formed of a plurality of battery cells 10*a* connected in parallel (fourteen battery cells in the example of FIG. 3). The battery cell 10*a* is, for example, a secondary battery such as a lithium ion battery having a cylindrical shape. Note that the battery cell 10*a* is not limited to the lithium ion secondary battery.

Figure 6:
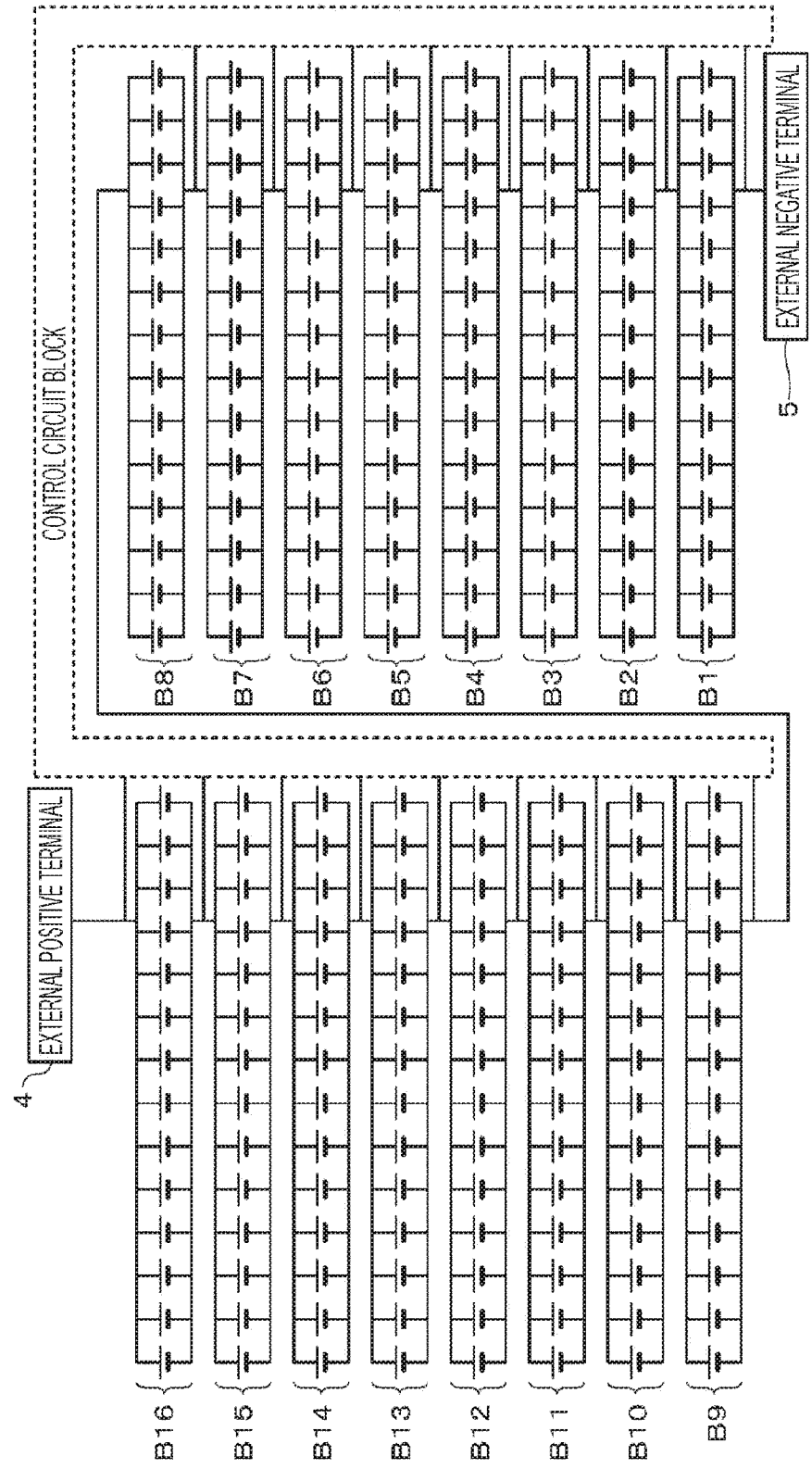
FIG. 6 is a block diagram illustrating an outline of an electric configuration of the power storage module according to a first embodiment of the present technology.

FIG. 6 is a block diagram illustrating an outline of an electric configuration of the power storage module according to the first embodiment of the present technology. For example, respective battery rows constitute battery blocks B1 to B8 in each of which a plurality of battery cells 10*a* is connected in parallel. Furthermore, the battery blocks B1 to B8 are connected in series and constitute the battery block group 10.

Although not illustrated, a battery block group 10 housed in the battery case 61 of the battery unit 52 also has a similar configuration, and for example, respective battery rows L1 to L8 constitute battery blocks B9 to B16 in each of which a plurality of battery cells 10*a* is connected in parallel. Furthermore, the battery blocks B9 to B16 are connected in series and constitute a battery block group 10. Note that the number of the battery cells 10*a* constituting each battery block is not limited to fourteen, and also the number of battery blocks constituting a battery block group is not limited to the above number.

In the battery block group 10, the plurality of battery rows (battery rows L1 to L8) in each of which the plurality of battery cells 10*a* is connected in parallel is arranged side by side in a direction substantially orthogonal to the row direction, and these battery rows are connected in series. With this structure, a current path can be rectified in a single direction (e.g., direction substantially orthogonal to the row direction of the battery rows) and a total length of the current path can be shortened. As a result, a resistance value can be suppressed from being increased.

In the battery block group 10, the battery row L1 and the battery row L2 are arranged in a manner facing each other, the battery row L2 and the battery row L3 are arranged in a manner facing each other, the battery row L3 and the battery row L4 are arranged in a manner facing each other, the battery row L4 and the battery row L5 are arranged in a manner facing each other, the battery row L5 and the battery row L6 are arranged in a manner facing each other, and the battery row L7 and the battery row L8 are arranged in a manner facing each other. In the battery rows L1, L3, L5, L7, the plurality of battery cells 10*a* forming each of the battery rows is arranged such that upper surfaces thereof are positive terminal surfaces and lower surfaces thereof are negative terminal surfaces. In the battery rows L2, L4, L6, L8, the plurality of battery cells 10*a* forming each of the battery rows is arranged such that upper surfaces thereof are negative terminal surfaces and lower surfaces thereof are positive terminal surfaces.

In the odd-numbered battery rows L1, L3, L5, L7, a plurality of battery cells 10*a* constituting each of the battery rows is arranged linearly in a closely contacting manner. In the example of FIG. 3, the fourteen battery cells 10a constituting each of the battery rows are arranged linearly in a closely contacting manner in each of the odd-numbered battery rows L1, L3, L5, L7.

On the other hand, in the even-numbered battery rows L2, L4, L6, L8, a plurality of battery cells 10a constituting each of the battery rows is arranged such that a space equivalent to substantially a size of one battery cell 10a is provided between two sets of the plurality of battery cells 10a arranged side by side linearly in a closely contacting manner. Preferably, each space equivalent to the size of one battery is provided at a position, for example, facing a center of the adjacent and facing battery row L1, L3, L5, or L7.

In the even-numbered battery rows L2, L4, L6, L8, the fourteen battery cells 10a constituting each of the battery rows are arranged such that a space equivalent to the size of one battery cell 10a is provided between two sets of seven battery cells 10a arranged side by side linearly in a close contacting manner. Each space equivalent to substantially the size of one battery is provided at, for example, a position facing the center of the adjacent and facing battery row L1, L3, L5, or L7.

In the space equivalent to substantially the size of one battery cell 10a, a hollow structural body (not illustrated) of the bottom case 61b and the hollow structural body 70 of the top case 61a facing the hollow structural body are fitted. As described above, the hole is provided on the bottom surface of the hollow structural body 70 of the top case 61a, and the projecting portion of the fourth side surface portion 20f is fitted into this hole, and the battery unit 51 is fixed to the fourth side surface portion 20f by screwing as needed. Since a fixing portion with the fourth side surface portion 20f is provided near the center of the battery unit 51, it is possible to prevent bulging near the center of the battery unit 51 caused by displacement of a battery cell 10a constituting a battery block group 10.

In the battery block group 10 formed of the battery rows L1 to L8, adjacent battery rows are arranged in a trefoil formation in which the adjacent battery rows are deviated from each other in the row direction by a length substantially same as a radius of an outer diameter circumference of a battery cell 10a. Arrangement of the trefoil formation includes arrangement in which substantially an equilateral triangle is formed by substantially centers of end surfaces of adjacent two battery cells 10a in one row and substantially a center of a battery cell 10a located in the other row next to the one row and interposed between the adjacent two battery cells 10a in the one row form.

In arrangement of the trefoil formation, the larger number of battery cells 10a can be housed in the battery case 61 having a limited space. Therefore, the number of battery cells per area can be increased, and energy density of the power storage module 1 can be increased. Incidentally, since heat tends to be accumulated in the battery block group 10 in arrangement of the trefoil formation, efficiently radiating heat by arranging a heat conductive material 53 described later becomes more effective.

As illustrated in FIG. 6, the battery blocks B1 to B16 are respectively connected to a control circuit block (hereinafter referred to as control block), and charging/discharging is controlled. Charging/discharging is performed via an external positive terminal 4 and an external negative terminal 5. For example, one power storage module 1 outputs voltage of (16×3.2 V=51.2 V).

The control block is provided inside the power storage module 1 in order to monitor voltage, current, and a temperature of the battery cell 10a. Information from the control block is transmitted to an external controller via communication. The external controller performs management for charging control, discharging control, deterioration suppression, and the like. For example, the control block monitors voltage of each battery block, converts detected voltage to a digital signal, and transmits the same to a control box ICNT that is the external controller. Not only voltage but also a temperature of each battery block may be detected, the temperature may be converted to digital data, and may be transmitted to the control box ICNT.

Figure 7:
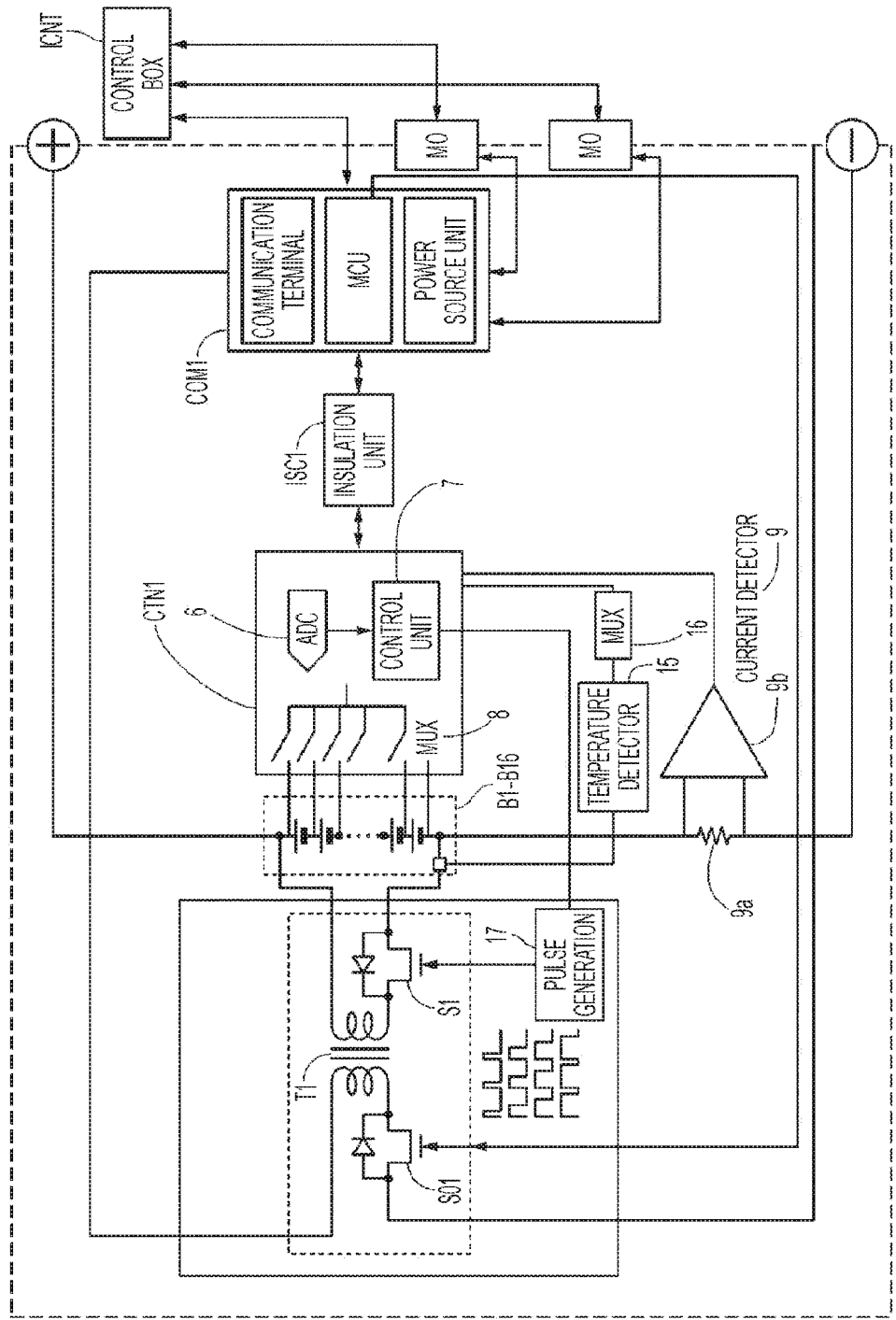
FIG. 7 is a block diagram illustrating an exemplary electric configuration of the power storage module according to the first embodiment of the present technology.

FIG. 7 illustrates an exemplary control block. As illustrated in FIG. 7, voltage at both ends in each of the sixteen battery blocks B1 to B16 connected in series as well as voltage of each battery block are detected. A multiplexer 8 (MUX 8) adapted to sequentially output voltage at both ends in each of the battery blocks B1 to B16 and voltage in each of the battery blocks is provided.

For example, the MUX 8 switches a channel in accordance with a predetermined control signal, and selects one piece of analog voltage data from among n pieces of analog voltage data. One piece of analog voltage data selected by the MUX 8 is supplied to an A/D converter (analog to digital converter (ADC) 6).

The ADC 6 converts the analog voltage data supplied from the MUX 8 to digital voltage data. For example, the analog voltage data is converted to digital voltage data of 14 to 18 bits. The digital voltage data from the ADC 6 is supplied to a communication unit COM1. The communication unit COM1 is controlled by a control unit 7 and communicates with an external device connected via a communication terminal. For example, communication with other power storage modules MO is performed via the communication terminal, and communication with the control box ICNT is performed via the communication terminal. Additionally, a control signal from the control box ICNT is received via the communication terminal. Thus, communication unit COM1 performs bidirectional communication.

Furthermore, the control unit 7 is adapted to control equalization of voltage at the battery blocks B1 to B16. Such control is referred to as cell balance control. For example, in the case where one battery block out of the plurality of battery blocks B1 to B16 reaches a use lower limit of discharge voltage, there are other battery blocks having residual capacity. In the case where next charging is performed, these other battery blocks having residual capacity may quickly reach an upper limit of charging voltage and cannot be fully charged. To avoid such unbalance, a battery block having residual capacity is forcibly discharged by turning on a metal oxide semiconductor field effect transistor (MOSFET). Meanwhile, a cell balance control method is not limited to a passive method described above, and a so-called active method and other various kinds of methods may also be applicable.

A control pulse for a primary-side switch (MOSFET) S1 of a flyback transformer T1 of a module balance control circuit to control voltage balance between the power storage module 1 and a plurality of power storage modules MO is supplied from a pulse generator 17. The pulse generator 17 generates a control pulse in accordance with a control signal from the control unit 7 of a module controller CTN1. For example, the pulse generator 17 outputs a control pulse subjected to pulse width modulation. A control pulse for a secondary-side switch (MOSFET) SO1 of the flyback transformer T1 is supplied from a micro controller unit (MCU) inside the communication unit COM1.

The control box ICNT determines a sequence of balance between the power storage modules on the basis of voltage information of each power storage module 1 and power storage modules MO. Whether charging/discharging is performed for the balance between the power storage modules is individually transmitted to the MCU in each power storage module. The MCU directly supplies a control signal to the secondary side of the flyback transformer or transmits a control signal to the primary side of the flyback transformer T1 by insulating communication via an insulation unit ISC1.

A temperature detector 15 is formed of a temperature detecting element such as a thermistor. Analog temperature data T detected by the temperature detector 15 and indicating a temperature in each of the battery blocks B1 to B16 is supplied to a cell temperature multiplexer 16 (MUX 16). For example, the analog temperature data T1 indicating a temperature in the battery block B1 is supplied to the MUX 16. Analog temperature data T2 indicating a temperature in the battery block B2 is supplied to the MUX 16. In a similar manner, analog temperature data T3 to T16 indicating respective temperatures of the battery blocks B3 to B16 is supplied to the MUX 16.

The MUX 16 switches a channel in accordance with a predetermined control signal, and selects one analog temperature data T from among sixteen pieces of analog temperature data T1 to T16. Then, the analog temperature data T selected by the MUX 16 is supplied to the ADC 6.

A current detector 9 detects a current value flowing in the plurality of battery blocks B1 to B16. The current detector 9 is formed of, for example, a current detection resistor 9*a* and a current detection amplifier 9*b*. Analog current data indicating voltage values at both ends of the current detection resistor 9*a* is detected by the current detection resistor 9*a*. The analog current data is constantly detected regardless of whether charging/discharging is being performed. The analog current data may also be detected in a predetermined cycle.

The detected analog current data is supplied to the current detection amplifier 9*b*. The supplied analog current data is amplified by the current detection amplifier 9*b*. The amplified analog current data is supplied to the ADC 6.

The ADC 6 converts the analog current data supplied from the current detection amplifier 9*b* to digital current data. The analog current data is converted to the digital current data by the ADC 6, and the digital current data is output.

For example, in the case of detecting excessive current during discharging in the module controller CTN1, it is determined that a state of discharging overcurrent is occurring and a switch (not illustrated) is controlled to be an open state (state to block the current). On the other hand, in the case of detecting excessive current during charging, the switch (not illustrated) is controlled to be the open state (state to block the current).

The insulation unit ISC1 has a function to insulate the communication unit COM1 from the module controller CTN1. In other words, reference potential in a power source of the communication unit COM1 and reference potential in a power source of the module controller CTN1 are separated and deemed independent. Additionally, in the insulated state, the insulation unit ISC1 has: a function to supply power source voltage to the module controller CTN1; and a function as a transmission medium for bidirectional communication.

For a bidirectional communication system achieved via the insulation unit ISC1, the CAN standard can be used. For a power transmission system achieved via the insulation unit ISC1, an electromagnetic induction system, a magnetic field resonance system, a radio wave reception system, or the like can be used.

According to the first embodiment, for example, a non-contact IC card technology is used. In the non-contact IC card technology, a flux of an antenna coil of a reader/writer is coupled to a flux of an antenna coil of a card, and communication and power transmission are performed between the card and the reader/writer. Communication is performed at a speed of 212 or 424 kbps by utilizing a system to modulate carrier waves of a frequency 13.56 kHz by amplitude shift keying (ASK). Specifications of the insulation unit ISC1 are similar to that of the above-described non-contact IC card. Additionally, for example, the insulation unit ISC1 is adapted to perform communication and power transmission between antennas (coils) formed in different layers of a multi-layer printed circuit board.

(Connecting Terminal Portion on Top Case Side)

Figure 8:
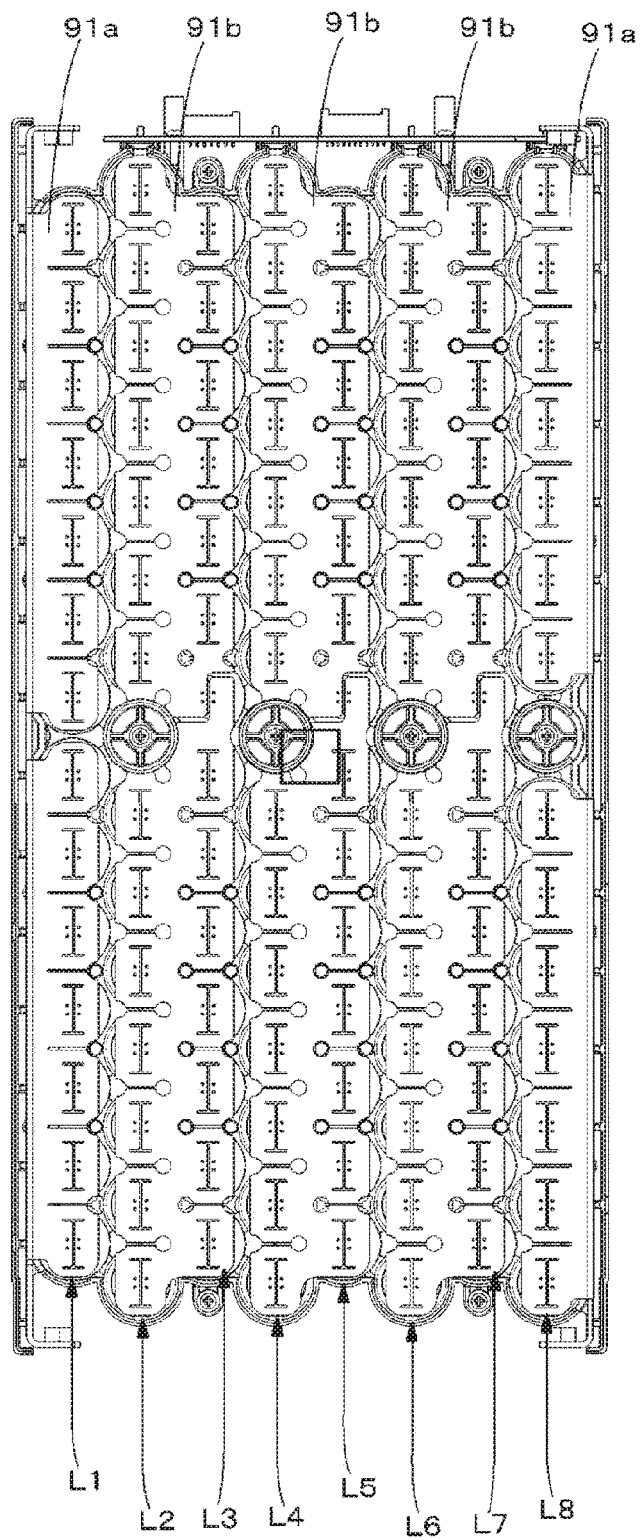
FIG. 8 is a plan view illustrating an outline of the power storage module.

The connecting terminal portion 91 which is a joining member to electrically connect a plurality of battery cells 10*a* is provided on terminal surfaces of the plurality of battery cells 10*a*. For example, the connecting terminal portion 91 has a plate-like body or the like having a flat surface shape formed in substantially a rectangular shape or the like. As illustrated in FIG. 8, for example, two connecting terminal portions 91*a* and three connecting terminal portions 91*b* are arranged side by side as the connecting terminal portions 91 in a direction substantially orthogonal to a row direction of battery rows. Incidentally, the connecting terminal portion 91*b* is provided with a plurality of holes through which the projecting portions 93*a* of the partition plate 93 are inserted.

The connecting terminal portion 91*a* is electrically joined to the terminal surfaces of the plurality of battery cells 10*a* constituting one battery row. The connecting terminal portion 91*b* is electrically joined to the terminal surfaces of the plurality of battery cells 10*a* constituting adjacent two battery rows.

Specifically, the connecting terminal portion 91*a* is electrically joined to positive terminals of the plurality of battery cells 10*a* constituting the battery row L1. The connecting terminal portion 91*a* is electrically joined to positive terminals of the plurality of battery cells 10*a* constituting the battery row L8.

The connecting terminal portion 91*b* is electrically joined to negative terminals of the plurality of battery cells 10*a* constituting the battery row L2 and positive terminals of the plurality of battery cells 10*a* constituting the battery row L3. The connecting terminal portion 91*b* is electrically joined to negative terminals of the plurality of battery cells 10*a* constituting the battery row L4 and positive terminals of the plurality of battery cells 10*a* constituting the battery row L5. The connecting terminal portion 91*b* is electrically joined to negative terminals of the plurality of battery cells 10*a* constituting the battery row L6 and positive terminals of the plurality of battery cells 10*a* constituting the battery row L7.

An exemplary joining method may be electric resistance welding, welding by laser beam heating, or the like, but not particularly limited to these methods, and a known welding method in the related art can be used as necessary.

According to the present technology, a resistance value can be decreased and terminal heat generation can be suppressed by connecting at least one battery row with one connecting terminal portion 91*a* or one connecting terminal portion 91*b*. The connecting terminal portions can also be joined by simple joining. A measuring terminal of a battery cell 10a can also be shared. Since a plurality of battery cells 10a constituting a battery row is joined by one connecting terminal portion, work efficiency at the time of assembly can be improved. Furthermore, since the number of joining points can be reduced, heat increase in a battery cell 10a can be suppressed at the time of assembling and joining. Heat generated in a battery cell 10a during charging/discharging can be conducted to the connecting terminal portion 91a and the connecting terminal portion 91b and radiated. Additionally, heat can be conducted to the outer case 20 and radiated via a heat conductive material 53 contacting the connecting terminal portion 91.

(Connecting Terminal Portion on Bottom Case Side)

A plurality of connecting terminal portions 91b is arranged side by side in a direction substantially orthogonal to a row direction of battery rows as the connecting terminal portions 91 on an inner surface of the bottom surface portion of the bottom case 61b. One connecting terminal portion 91b is electrically joined to lower-surface terminals of battery cells 10a constituting two adjacent battery rows.

Specifically, the connecting terminal portion 91b is electrically joined to negative terminals of the plurality of battery cells 10a constituting the battery row L1 and positive terminals of the plurality of battery cells 10a constituting the battery row L2. The connecting terminal portion 91b is electrically joined to negative terminals of the plurality of battery cells 10a constituting the battery row L3 and positive terminals of the plurality of battery cells 10a constituting the battery row L4. The connecting terminal portion 91b is electrically joined to negative terminals of the plurality of battery cells 10a constituting the battery row L5 and positive terminals of the plurality of battery cells 10a constituting the battery row L6. The connecting terminal portion 91b is electrically joined to negative terminals of the plurality of battery cells 10a constituting the battery row L7 and positive terminals of the plurality of battery cells 10a constituting the battery row L8.

(Positive Insulation Sheet on Top Case Side)

The positive insulation sheet 92 is superimposed on positive terminal surfaces of battery cells 10a constituting a battery block group 10. Specifically, the positive insulation sheet 92 is superimposed on the positive terminal surfaces of the battery cell 10a each having an upper surface as a positive terminal surface. The positive insulation sheet 92 is superimposed on positive terminal surfaces of a plurality of battery cells 10a respectively constituting each battery row.

The positive insulation sheet 92 is formed of a material having an electric insulating property, such as a resin material having an electric insulating property. The positive insulation sheet 92 is provided with a plurality of openings in which a plurality of projecting positive terminals is fitted.

Each positive terminal is fitted into each of the plurality of openings of the positive insulation sheet 92, and each positive terminal is exposed from the opening of the positive insulation sheet 92. A positive terminal exposed from an opening of the positive insulation sheet 92 is electrically joined to a connecting terminal portion 91a or a connecting terminal portion 91b. On the other hand, since a peripheral surface of a positive terminal is covered with the positive insulation sheet 92, the peripheral surface of each positive terminal is insulated from the connecting terminal portion 91a or the connecting terminal portion 91b.

(Positive Insulation Sheet on Bottom Case Side)

In a manner similar to a positive insulation sheet 92 on the bottom case side, a positive insulation sheet 92 on the bottom case 61b side is adapted to prevent short-circuit between the peripheral surface of the projecting positive terminal and the connecting terminal portion 91b. The positive insulation sheet 92 on the battery case side is superimposed on the positive terminal surfaces of the battery cells 10a of the battery row L2, battery row L4, battery row L6, and battery row L8.

(Structure of Partition Plate)
(Partition Plate)

Figure 9:
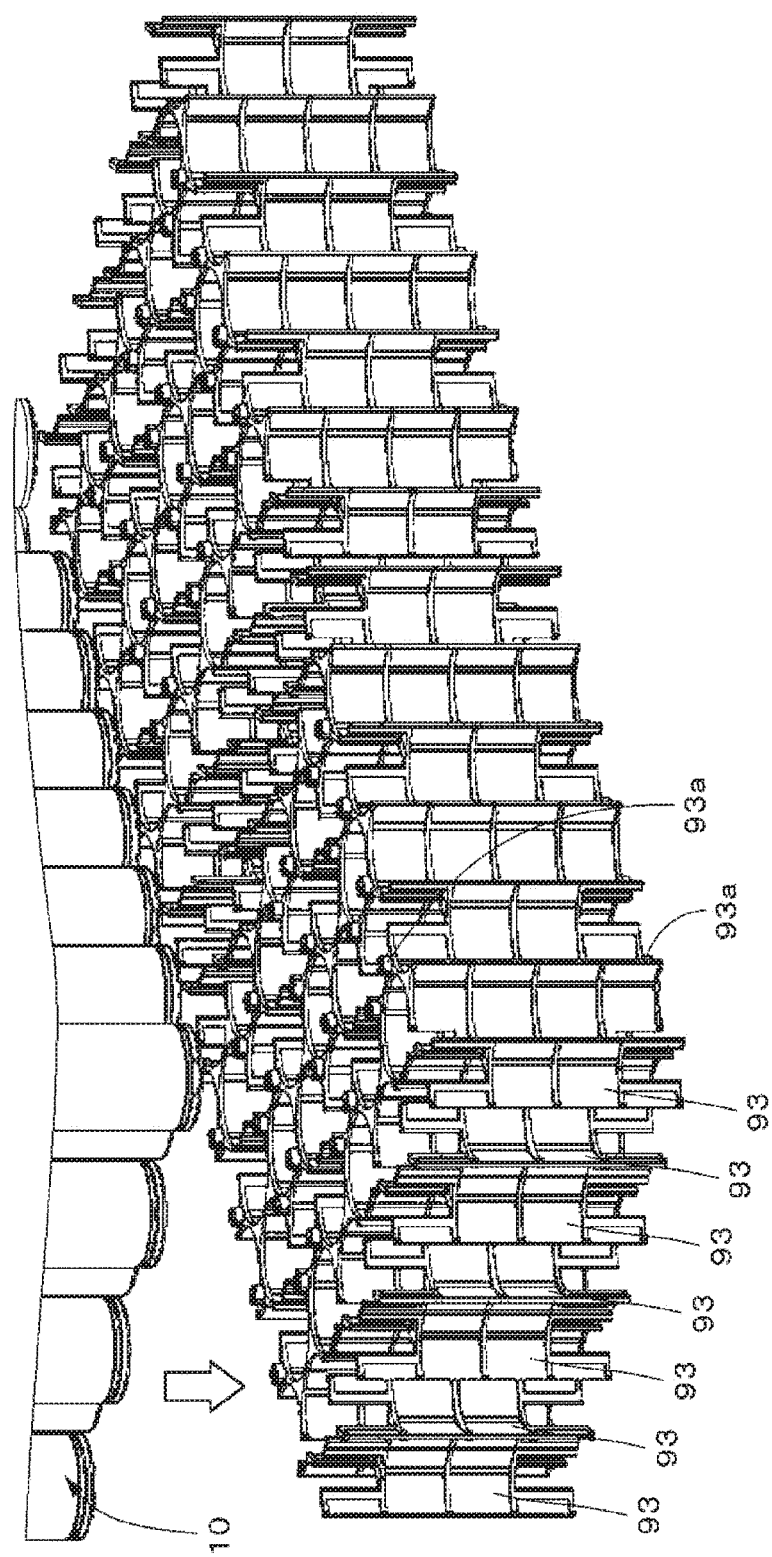
FIG. 9 is a schematic perspective view illustrating a structure of partition plates and a state before incorporating partition plates with battery block groups.

FIG. 9 is a schematic perspective view illustrating a structure of partition plates and a state before incorporating the partition plates with battery block groups. A partition plate 93 is inserted between adjacent battery rows facing each other of a battery block group 10 as indicated by an arrow. The partition plate 93 is, for example, a resin molded object or the like formed of a resin having an electric insulating property.

Additionally, the partition plate 93 is detachable from the battery case 61. The partition plate 93 includes a plurality of projecting portions 93a on an upper surface and a lower surface, and the partition plate is attached to the battery case 61 by fitting the projecting portions 93a into the holes 72 of the battery case 61, and is detached from the battery case 61 by taking out the projecting portions from the holes.

For example, the plurality of projecting portions 93a is provided at predetermined positions on the upper surface and the lower surface of the partition plate 93. The plurality of projecting portions 93a provided on the upper surface is fitted into the plurality of holes 72 used for determining a position of partition plate and provided at predetermined positions of the top case 61a, and the plurality of projecting portions 93a provided on the lower surface is fitted into the holes 72 used for determining a position of the partition plate and provided at predetermined positions of the bottom case 61b. Consequently, the partition plate 93 is fixed between the top case 61a and the bottom case 61b.

A plurality of battery cells 10a can be arranged and fixed at predetermined positions by the fixed partition plates 93. Consequently, unlike the related art, it is possible to form a battery block group 10 having a plurality of battery cells 10a fixed at positions optimal for high energy density without using any holder case or the like including a plurality of individual battery holders each conforming to a shape of one battery. Additionally, since the fixed partition plates 93 are provided between multiply-stacked battery rows while the side surfaces of the battery cells 10a are vertically oriented, a load applied from an upper-side battery cell 10a to a lower-side battery cell 10a can be reduced or the like, and pressure and stress is dispersed. As a result, force can be distributed to an entire portion of the battery block group 10. Consequently, deformation of the battery cell 10a can be suppressed, for example.

(Front End Portion of Power Storage Module)

Figure 10:
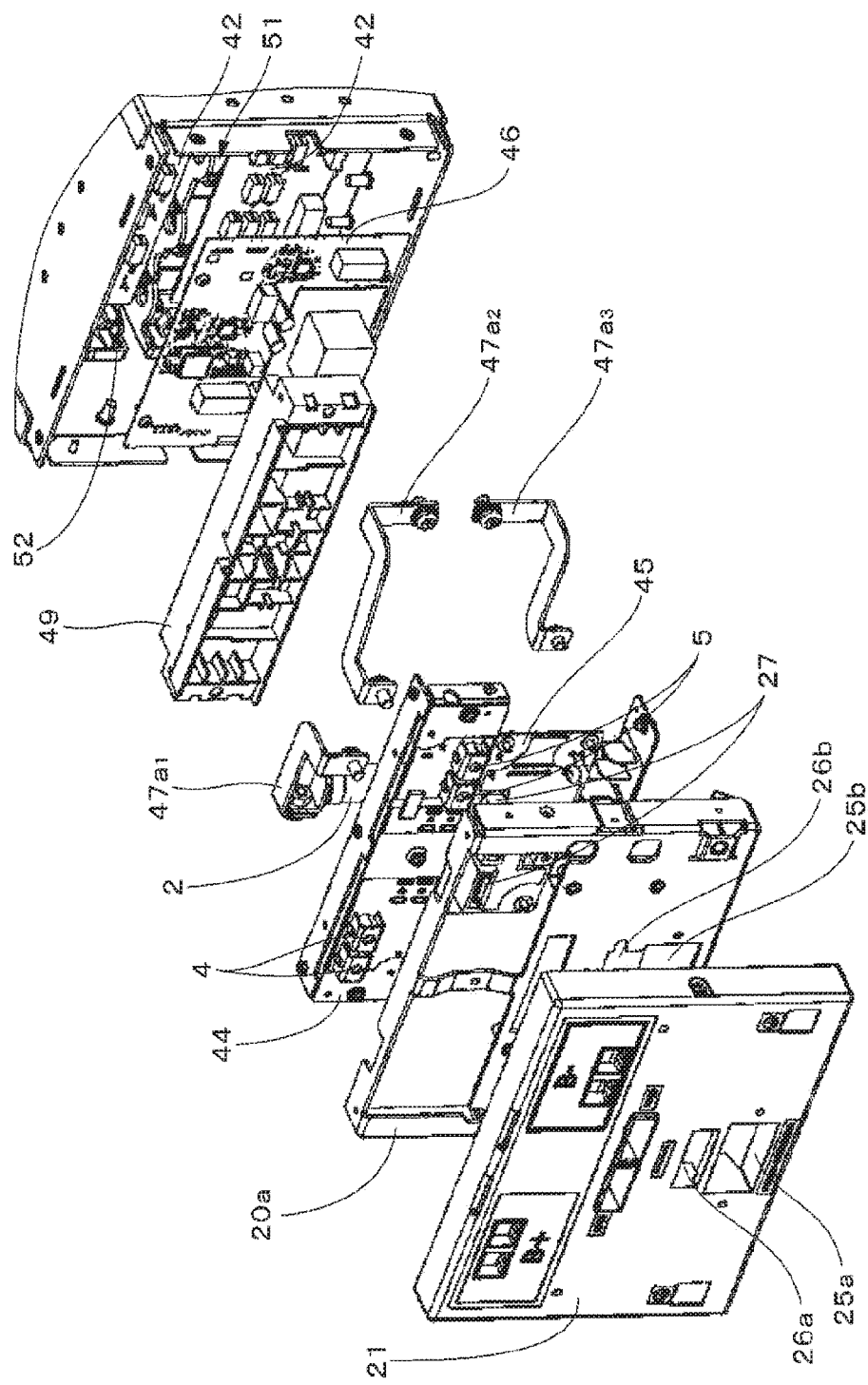
FIG. 10 is an exploded perspective view illustrating a configuration of a front end portion of the power storage module.
Figure 11:
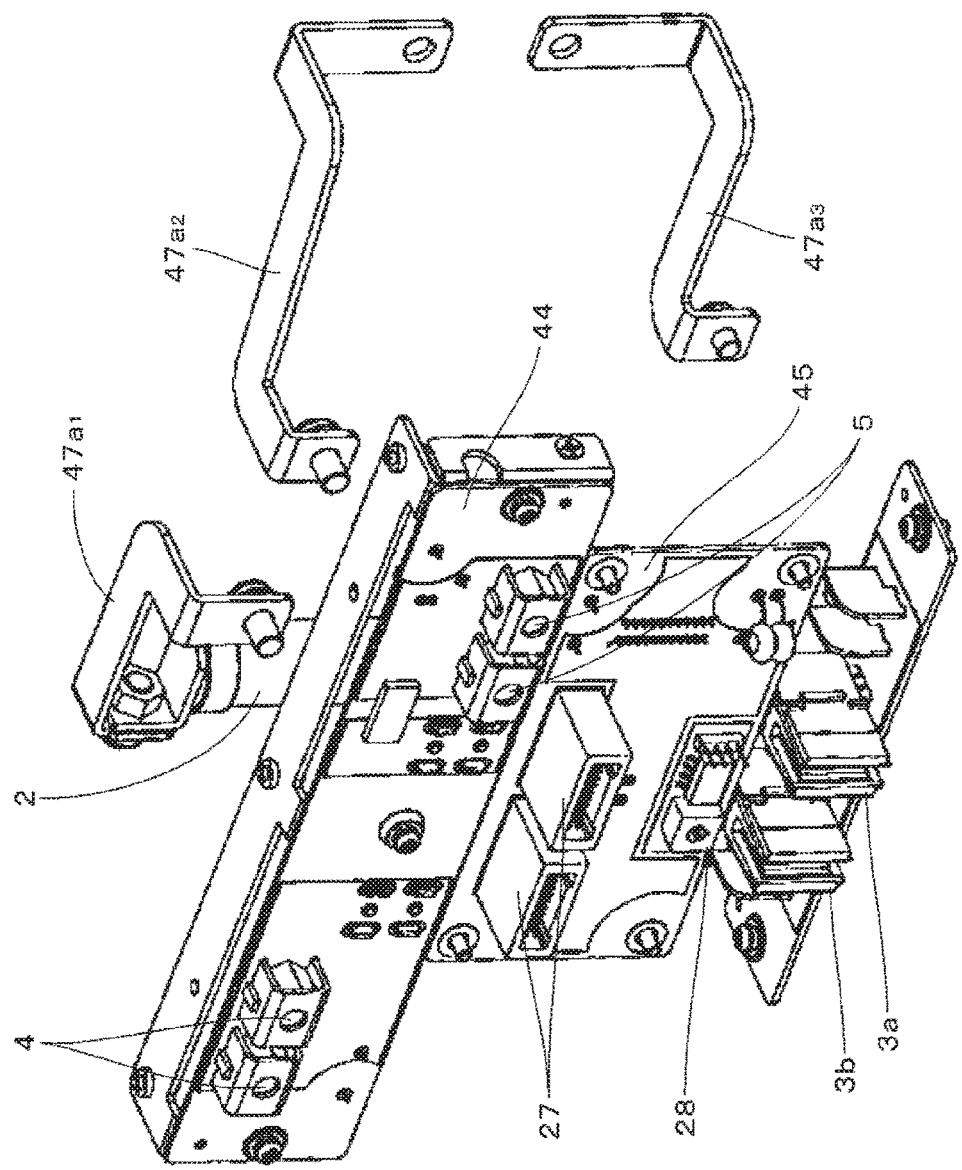
FIG. 11 is a perspective view illustrating a member detached together with a front surface portion.
Figure 12:
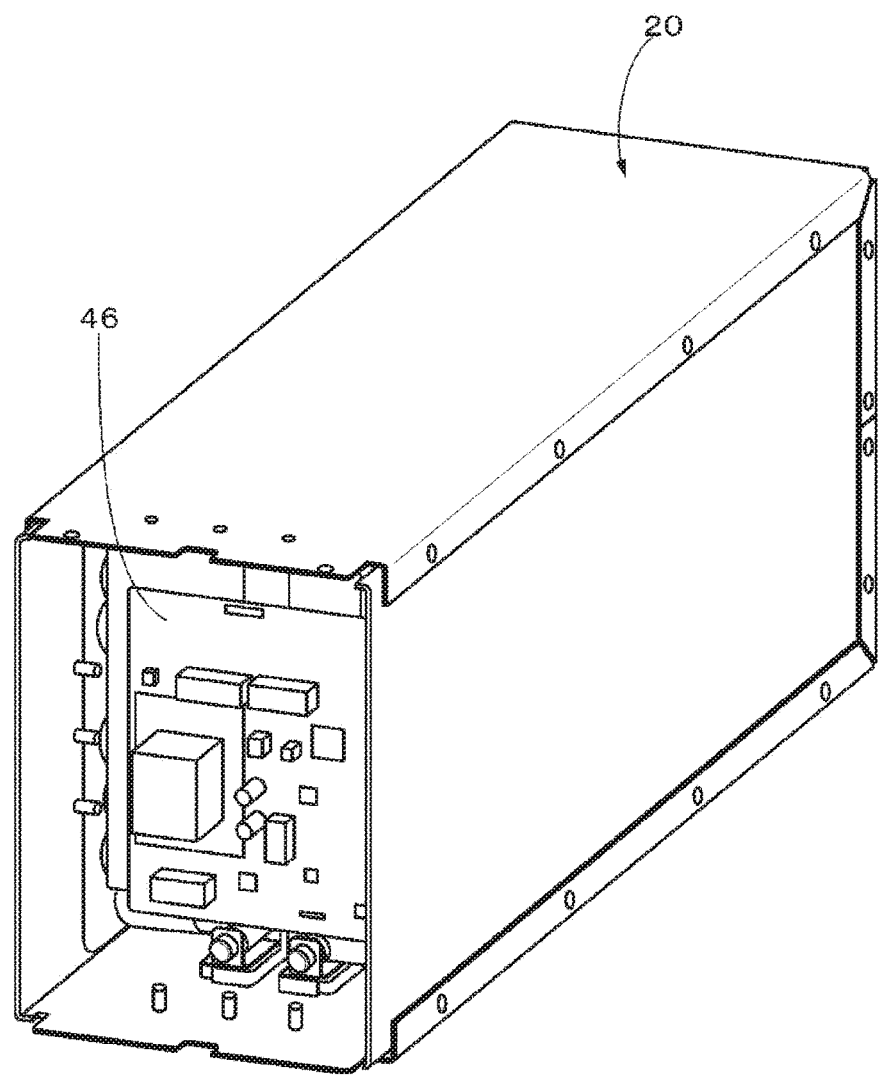
FIG. 12 is a perspective view illustrating a state in which the front surface portion is detached.

FIG. 10 is an exploded perspective view illustrating a configuration of a front end portion of the power storage module. FIG. 11 is a perspective view illustrating a member detached together with the front surface portion. FIG. 12 is a perspective view illustrating a state in which the front surface portion is detached.

As illustrated in FIG. 10, the front surface portion 20a of the housing is covered with the protective cover 21 and ensures, on an inner surface side of the front surface portion 20a, a space to house a group of components including a substrate and the like. The group of components including at least an external communication substrate 45 and an output terminal substrate 44 illustrated in FIG. 11 are arranged and fixed in this space. For example, the group of components specifically includes members including: the output terminal substrate 44 provided with the external positive terminal 4 and the external negative terminal 5 which are output terminals; the external communication substrate 45; a fuse 2; bus bars 47a1 to 47a3; a substrate holding member 49; and connectors 3a and 3b. The external communication substrate 45 and the output terminal substrate 44 are connected to the main substrate 46 via a connector (not illustrated). The substrate holding member 49 is formed of a material, such as a resin, having an insulating property, and has a role to provide insulation between substrates, between a substrate and a component or the like. Furthermore, each of two sub-substrates 42 is fixed to each of the battery unit 51 and the battery unit 52. For example, the sub-substrate 42 is arranged and fixed such that one main surface of the sub-substrate 42 faces one wall surface, out of four wall surfaces of the battery case 61, orthogonal to a row direction of a battery row and further partly contacts the same wall surface. The sub-substrates 42, output terminal substrate 44, external communication substrate 45, and main substrate 46 are mounted with the control block including the monitoring and controlling circuit illustrated in FIGS. 6 and 7. The group of components including the plurality of substrates and the like and separately formed is disposed in the space between the inner surface of the front surface portion 20a and front wall surfaces of the battery unit 51 and the battery unit 52, and the respective components are connected via connecting members such as plate-like members like the bus bars 47a1 to 47a3, a connector, and the like. Consequently, the substrates can be easily connected. Such a power storage module 1 has an efficient and excellent assembling property, and can achieve high energy by space saving.

When the front surface portion 20a covered with the protective cover 21 is detached, the group of components fixed to the front surface portion 20a and including at least the above-described external communication substrate 45 and output terminal substrate 44 is also detached integrally with the front surface portion 20a. As illustrated in FIG. 12, when the front surface portion 20a and the group of components are detached, a portion including the main substrate 46 arranged on the side deeper than the group of components is exposed to the outside from an opening of the outer case 20 made after detaching the front surface portion 20a. Then, it becomes possible to put a hand into the inside from the opening to perform work such as maintenance for the main substrate 46, quickly take out the main substrate 46, and so on. Therefore, since maintenance for the main substrate 46 and the like can be performed just by detaching the front surface portion 20a and the group of components integrally detached therewith, maintainability can be improved. In other words, maintenance, inspection, replacement of a component included in the group of components, and the like can be easily performed. Furthermore, it is possible to eliminate necessity to takeout complex wiring and rearrange the wiring.

The external positive terminal 4 and the external negative terminal 5 provided to perform charging/discharging for the power storage module 1 are exposed to the outside passing through the protective cover 21 and the opening provided on the front surface portion 20a.

Additionally, the front surface portion 20a and the protective cover 21 of the power storage module 1 are formed with windows 25a to b and 26a to b close to each other on the protective cover 21 and the front surface portion 20a. As illustrated in FIG. 1, the windows 25a to 25b and 26a to 26b are covered with a conductive member 11 during operation of the power storage module 1.

Figure 13:
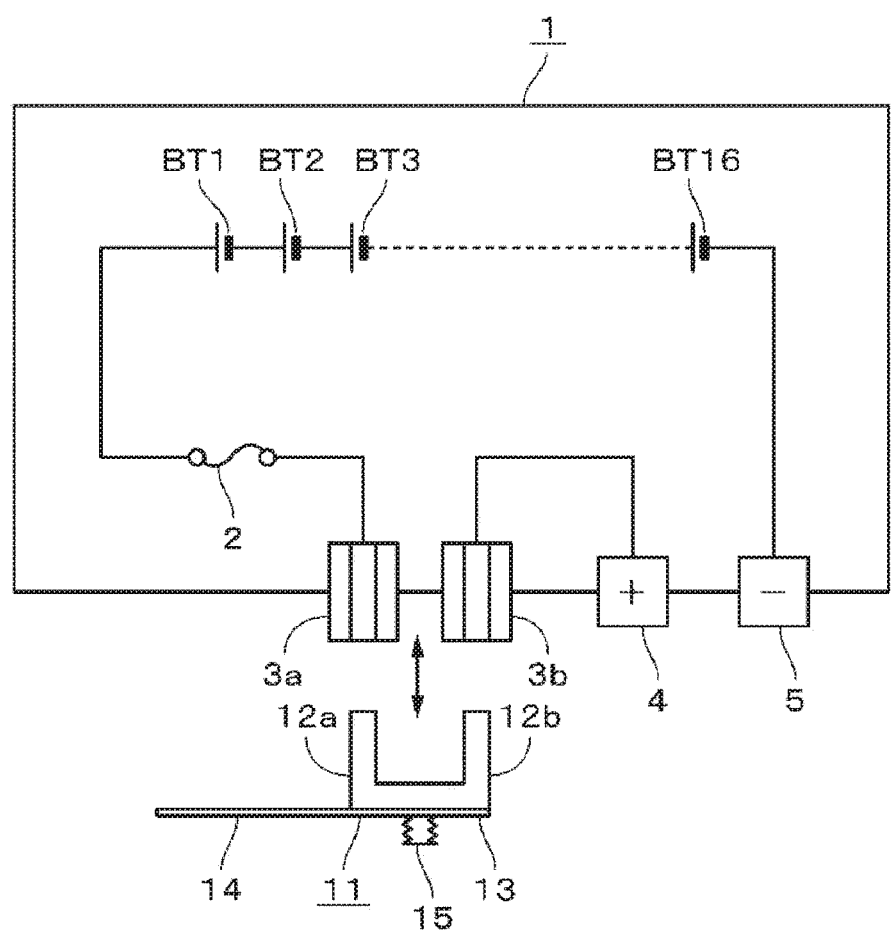
FIG. 13 is a block diagram illustrating an outline of an electric configuration of the power storage module according to the first embodiment of the present technology.

The connectors 3a and 3b are erected on the inner side of the windows 25a to b formed on the front surface portion 20a. As illustrated in FIG. 13, positive-side terminals of the battery blocks B1 to B16 connected in series are connected to the connector 3a via the fuse 2 that is a current blocking element. The other connector 3b is provided near the connector 3a. The connector 3b is connected to the external positive terminal 4. Negative-side terminals of the battery blocks B1 to B16 are connected to the external negative terminal 5.

The conductive member 11 formed in an insertable/removable manner is provided as a connecting portion relative to the connectors 3a and 3b in order to prevent false connection. The conductive member 11 has a structure in which a conductive plate is bent so as to have a pair of plate-like projections 12a and 12b and a main portion of the conductive plate is mounted on one surface of a support board 13. One end of the support board 13 is extended, thereby forming a cover 14. Additionally, a knob 15 is formed on the other surface of the support board 13. The support board 13 including the cover 14 and the knob 15 is a molded object of, for example, a synthetic resin.

Each of the connectors 3a and 3b has two spring contact plates arranged in a manner facing each other, and each of the plate-like projections 12a and 12b of the conductive member 11 is inserted into a gap between the two spring contact plates facing each other via the windows 25a to b. Additionally, the windows 26a to b are closed by the cover 14 integrally formed with the support board 13 of the conductive member 11. Since each of the plate-like projections 12a and 12b is sandwiched between the two spring contact plates in each of the connectors 3a and 3b, it is possible to keep an inserted state of the conductive member 11 into the connectors 3a and 3b.

Since the plate-like projections 12a and 12b of the conductive member 11 are inserted into the gaps of the respective connectors, the connector 3a and the connector 3b are connected (conducted) by the conductive member 11. On the other hand, when the plate-like projections 12a and 12b of the conductive member 11 are taken out from the gaps of the respective connectors, the connector 3a and the connector 3b are disconnected (not conducted). Thus, it is possible to switch the state between a connected state in which the conductive member 11 is inserted into the connectors 3a and 3b and a disconnected state in which the conductive member 11 is taken out from the connectors 3a and 3b.

Electronic component 28 used for setting or connecting are arranged on the inner side of the windows 26a and 26b formed on the front surface portion 20a. The electronic components 28 may be, for example, a slide switch, a rotary switch, a JTAG connector, and the like. For example, an address for a power storage module 1 is set by a rotary switch. In other words, a plurality of power storage modules 1 can be connected for use, and in the case of connecting the plurality thereof, an identification address is set for each of the power storage modules. The external controller performs control processing on the basis of the address. The slide switch is used to add an address to be designated by the rotary switch.

The JTAG connector is a standard connector proposed by the Joint European Test Action (JTAG). Test data is received and output in order to test a micro processing unit (MPU), an integrated circuit (IC), and the like inside the case via the JTAG connector, and firmware of the MPU inside is rewritten. Note that a switching component, a connector, and the like other than the above-described elements may also be used as the electronic components.

In the connected state in which the conductive member 11 is inserted into the connectors 3a and 3b, the cover 14 covers the windows 25a to b and 26a to b in front of operating surfaces of the electronic components. In other words, access to the electronic components is blocked in the connected state. On the other hand, when the conductive member 11 is taken out from the connectors 3a and 3b, the windows in front of the operating surface of a setting unit are opened, and for example, an address of a power storage module 1 can be set by operating the operating surface through the windows 25a to b and 26a to b.

Only in the case of opening the windows 25a to b and 26a to b in front of the operating surfaces by taking out the conductive member 11, access to the operating surfaces is enabled, and setting operation for the electronic components can be performed. Since setting operation is performed from the outside of the outer case 20, workability can be more improved and safety is more ensured than in the case of operating the electronic components inside the case.

Furthermore, the power storage module 1 is provided with a connector 27 that is a communication terminal to communicate with the external controller. As described above, the power storage module 1 is provided with the control block to monitor voltage, current, and a temperature of a battery. The information from the control block is transmitted to the external controller via communication. The external controller performs management for charging control, discharging control, deterioration suppression, and the like.

For communication with the external controller performed via the connector 27, a serial interface is used, for example. For the serial interface, specifically, a system management (SM) bus or the like is used. For example, an I2C bus may be used. The I2C bus is synchronized serial communication that performs communication using two signal lines for a serial clock (SCL) and bidirectional serial data (SDA).

(Insulating Material)

The insulating material 54 is provided to ensure an insulating property or enhance the insulating property between the battery units 51, 52 and the outer case 20. The insulating material 55 is formed of a material, such as a resin material, having an electric insulating property.

A heat conductive material 53 is attached to the insulating material 54. The insulating material 54 is, for example, an insulation sheet which is a sheet-like insulating material, and interposed between the battery unit 51 and the outer case 20 and between the battery unit 52 and the outer case 20. Incidentally, the insulating material 55 may be formed of one insulation sheet, or may also have a stacked structure or the like in which two or more insulation sheets are stacked. A stacked structure including a resin plate and a metal plate in which, for example, one metal plate is provided between two sheet-like resins may also be applicable. In this case, a high insulating property can be ensured, and also a heat radiation property can be improved.

Incidentally, in the case where an insulating property between the battery unit and the outer case is ensured by another member, for example, in the case of covering the openings 71 provided in the battery unit 51 and exposing the connecting terminal portions 91 with another insulating material, the insulating material 54 may be omitted.

(Heat Conductive Material)

A heat conductive material 53 is interposed between an inner surface of the outer case 20 and the connecting terminal portions 91 exposed from the openings of the battery case, and provided in order to conduct and radiate heat of the battery block group 10 to the outer case via the heat conductive material 53. A plurality of heat conductive materials 53 is arranged in a manner contacting the connecting terminal portions 91 as members interspersed in accordance with predetermined distribution. Using such interspersed members can suppress heat from being accumulated between adjacent battery cells via the heat conductive materials 53 and can efficiently radiate heat.

The heat conductive material 53 is formed of, for example, a material having excellent heat conductivity. Preferably, the heat conductive material 53 is a material having at least any one of an impact absorbing characteristic, a heat resistance property, and an insulating property which are excellent in addition to the heat conductivity. Incidentally, a preferable heat resistance property is a heat resistance property in which a melting point or a glass transition point is about 200° C. or more.

For the heat conductive material 53, for example, it may be possible to use a material having excellent heat conductivity such as a plate-like body or the like obtained by applying insulation coating treatment to aluminum, copper, magnesium, metal silicon, or the like. For example, for the heat conductive material 53, it may be possible to use silicon or the like which is a material having excellent heat conductivity, an excellent impact absorbing characteristic, and a heat resistance property or a rubber having excellent heat conductivity and an insulating property. More specifically, for the heat conductive material 53, for example, it may be possible to use a flexible silicon sheet (FSL250BH) of Denka Company Limited (DENKA) which is a material having high heat conductivity (low heat resistance) and obtained by highly filling silicone with ceramic filler. The heat conductive material 53 may also have a structure (e.g., stacked structure) combining a heat conductive material having excellent heat conductivity with a buffering material having a heat resistance property and an impact absorbing characteristic which are excellent. In the case where the heat conductive material 53 also has an excellent impact absorbing characteristic, impact to a battery cell 10a can be reduced by a cushion effect of the heat conductive material 53. Furthermore, impact to a load-concentrated portion and a terminal joining portion of a battery block group 10 can be reduced, and resistance to impact can be improved.

(Shape of Heat Conductive Material)

FIG. 14A is a perspective view illustrating an exemplary structure of a heat conductive material. FIGS. 14B and 14C are perspective views illustrating a state in which the heat conductive material is arranged on the connecting terminal portion. As illustrated in FIG. 14A, the heat conductive material 53 is, for example, a sheet-like member having substantially a circular flat surface shape provided with high heat conductivity. Note that the sheet-like refers to a thin flat shape.

Preferably, the flat surface shape of the heat conductive material 53 has an area smaller than an area of a flat surface shape of a battery cell 10a (hereinafter suitably referred to as flat surface shape of an end surface of the battery cell 10a) in view from a normal line direction of a surface on which the heat conductive material 53 is arranged. The reason is that the end surface of the battery cell 10a is not completely covered with the heat conductive material 53, a clearance adapted to degas a battery cell 10a in the event of abnormality is formed, and a degassing property can be improved. Incidentally, in the case where the area of the heat conductive material 53 is too small, a heat radiation property tends to be degraded, but the degassing property is further improved. Additionally, it is preferable that the heat conductive material 53 be arranged in a position corresponding to substantially a center of the end surface of the battery cell 10a. The reason is that heat of the battery cell 10a can be more efficiently radiated.

Furthermore, it is more preferable that the heat conductive material 53 have a flat surface shape conforming to a flat surface shape of the terminal surface of the battery cell 10a joined to the connecting terminal portion 91. The reason is that heat of the battery cell 10a can be more efficiently radiated. Incidentally, the shape conforming to the flat surface shape of the terminal surface of the battery cell 10a refers to a shape same as or similar to the flat surface shape of the terminal surface. For example, in the examples of FIGS. 14B and 14C, the heat conductive material 53 has a flat surface shape substantially same as a positive terminal 10a1 of the battery cell 10a having substantially a circular flat surface shape, and has a shape similar to a negative terminal 10a2 of the battery cell 10a having substantially the circular flat surface shape. Note that the flat surface shape of the heat conductive material 53 can have various kinds of shapes and not limited to the shape conforming to the flat surface shape of the terminal surface of the battery cell 10a and also not limited to substantially the circular flat surface shape.

In the example illustrated in FIG. 14B, the heat conductive material 53 having the circular shape same as the surface of the positive terminal 10a1 is arranged in a manner facing the surface of the positive terminal 10a1 via the connecting terminal portion 91, and heat can be efficiently conducted from the positive terminal 10a1 via the connecting terminal portion 91. In the example illustrated in FIG. 14C, the heat conductive material 53 having the circular shape same as the surface of the negative terminal 10a2 is arranged in a manner facing a center portion of the surface of the negative terminal 10a2 via the connecting terminal portion 91, and heat can be efficiently conducted from the negative terminal 10a2 via the connecting terminal portion 91.

In the example of the battery cell 10a having a cylindrical shape, an arrangement surface of the heat conductive material 53 is a surface on a side not provided with a safety valve for degassing like the example illustrated in FIG. 14C in terms of improving a degassing property. For example, the heat conductive material 53 may be arranged on the side of the negative terminal 10a2.

(Distribution of Heat Conductive Materials)

In the power storage module 1, a portion close to a center of a battery block group 10 where heat tends to be accumulated is likely to have a high temperature in cycle operation of charging/discharging for the power storage module 1. Additionally, a front end portion near heat generating members such as the fuse 2, sub-substrate 42, output terminal substrate 44, and external communication substrate 45 which generate heat while operating the power storage module 1 is likely to have a high temperature. Therefore, temperature variation is caused between respective battery cells 10a in the battery block group 10. In contrast, according to the present technology, local temperature increase in the battery block group 10 can be suppressed because a heat radiation property is locally enhanced by arranging heat conductive materials 53 densely in a region likely to have a high temperature. Consequently, a service life of the power storage module 1 can be extended. Particularly, variation of capacity degradation between battery cells 10a in the case of using large current (for example, using current 1 C or more), and charging/discharging operation for the power storage module 1 can be stably performed for a long period. Additionally, since the minimum number of heat conductive materials 53 can be arranged, it is possible to provide a contribution in reducing a weight of the power storage module 1 and also possible to provide a contribution in reducing a weight of a power storage system formed of a large number of power storage modules 1.

Incidentally, there is a technology of arranging one heat radiation sheet on an entire surface of a battery block group 10 as an exemplary comparison of the present technology. However, in this technology, a heat radiation property can be improved in an entire area but a gas jetted in the event of abnormality of a battery cell is hardly jetted to the outside of the outer case. As a result, the jetted gas is filled inside the battery block group 10 and peripheral cells come to have high temperatures, and the abnormality is transmitted to the peripheral cells in a chain reaction. In contrast, the heat conductive materials 53 of the present technology can ensure a ventilating portion inside the power storage module 1 and also can ensure a gas flow path in the event of abnormality by using a plurality of interspersed members or a member having a clearance.

Figure 15:
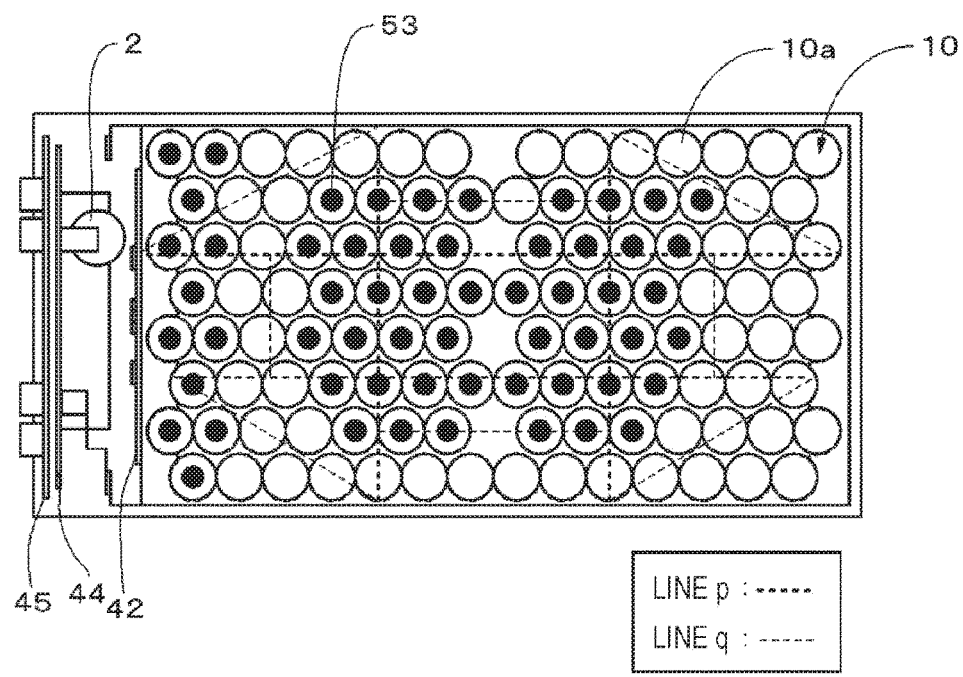
FIG. 15 is a schematic plan view illustrating exemplary distribution of the heat conductive materials.

In the following, exemplary distribution of the heat conductive materials 53 will be described. FIG. 15 is a schematic plan view illustrating exemplary distribution of the heat conductive materials 53 on an end surface of a battery block group in a plan view from a normal line direction of an arrangement surface of the heat conductive materials 53. As indicated by dotted lines p in FIG. 15, a region surrounded by an outermost peripheral edge of the battery block group is equally divided into three in a vertical direction and then equally divided into three in a horizontal direction, thereby obtaining nine regions. A center region out of the nine regions will be referred to as a center portion, and regions surrounding the center portion will be referred to as peripheral portions.

For example, the heat conductive materials 53 are arranged so as to have distribution in which an area occupying ratio occupied by the heat conductive materials 53 is larger in the center portion. For example, the heat conductive materials 53 are arranged densely in the center portion and the heat conductive materials 53 are arranged more sparsely in the peripheral portions than in the center portion. For example, such sparseness and denseness are determined by comparing a size of an area occupied by the heat conductive materials 53 (area occupying ratio of heat conductive materials per unit area by setting, as the unit area, one region out of the nine regions obtained by making six divisions substantial equally. For example, in the example of the drawing, an area occupying ratio of the heat conductive materials 53 in the center portion is calculated as (total area of the heat conductive materials 53 inside the center portion/1), and an area occupying ratio of the heat conductive materials 53 in the peripheral portions is calculated as (a total area of the heat conductive materials 53 inside the peripheral portions/8). In the case where the heat conductive materials 53 are arranged more densely in the center portion than in the peripheral portions, the area occupying ratio of the heat conductive materials 53 in the center portion is higher than the area occupying ratio of the heat conductive materials in the peripheral portions.

Additionally, in the peripheral portions, it is preferable to have uneven distribution in which that an area occupying ratio of the heat conductive materials 53 near the heat generating members be larger. Exemplary heat generating members may be the fuse 2, sub-substrate 42, output terminal substrate 44, external communication substrate 45, and the like which generate heat during operation of the power storage module 1. The reason is that heat of the battery block group 10 can be more efficiently radiated by densely arranging the heat conductive materials 53 on a side of the heat generating members. For example, the heat conductive materials 53 are densely arranged on a front end side of the peripheral portions located near the heat generating members (three regions on the front end side), and the heat conductive materials 53 are more sparsely arranged in other peripheral portions excluding the front end side of the peripheral portions than on the front end side of the peripheral portions. For example, an area occupying ratio of the heat conductive materials 53 on the front end side of the peripheral portions near the heat generating members (total area of the heat conductive materials 53 on the front end side of the peripheral portions/3) is higher than an area occupying ratio of the heat conductive materials 53 in other peripheral portion excluding the front end side of the peripheral portions (total area of the heat conductive materials 53 in other peripheral portions excluding the front end side of the peripheral portions/5).

Also, the regions of the peripheral portions may also have distribution in which area occupying ratios occupied by the heat conductive materials 53 are uneven. The reason is that heat of the battery block group 10 can be more efficiently radiated by densely arranging the heat conductive materials 53 at a position where heat tends to be generated with high possibility. For example, the heat conductive materials 53 are arranged densely on the center portion side in the respective regions of the three regions constituting the peripheral portions on the front end side, and the heat conductive materials are more sparsely arranged on an outer peripheral side than on the center portion side. Alternatively, the heat conductive materials 53 are sparsely arranged on the center portion side and the heat conductive materials 53 are more densely arranged on the outer peripheral side than on the center portion side. Otherwise, the heat conductive materials 53 on the center portion side and the heat conductive materials 53 on the outer peripheral side are arranged in an equal density level.

For example, the heat conductive materials 53 are densely arranged on the center portion side in respective regions of three regions constituting the peripheral portions on a back end side, and the heat conductive materials are more sparsely arranged on the outer peripheral side than on the center portion side. The heat conductive materials 53 are densely arranged on the center portion side in respective regions of two regions constituting the peripheral portions on the center side, and the heat conductive materials 53 are more sparsely arranged on the outer peripheral side than on the center portion side.

In this case, denseness and sparseness of the heat conductive materials 53 are determined as follows. For example, each of the six regions of the peripheral portions is substantially equally divided into two by a straight line (straight line indicated by a dotted line q in the drawing) intersecting with a straight line directed in a center direction. One region out of the two regions divided into two substantially equally is set as a unit area, and performance is made by comparing a size of an area occupied by the heat conductive materials in the unit area (area occupying ratio of the heat conductive materials).

(Other Exemplary Distribution of Heat Conductive Materials)

Distribution of heat conductive materials 53 is only needed to be dense in the center portion and sparser in the peripheral portions than in the center portion, and various kinds of distribution are adoptable.

For example, distribution of heat conductive materials 53 may be as described below. In the following, other exemplary distribution of heat conductive materials 53 (Examples 1 to 3) will be described with reference to FIGS. 16A, 16B, and 16C. Note that heat conductive materials 54 attached to an insulating material 54 are illustrated in FIGS. 16A, 16B, and 16C.

Figure 16A:
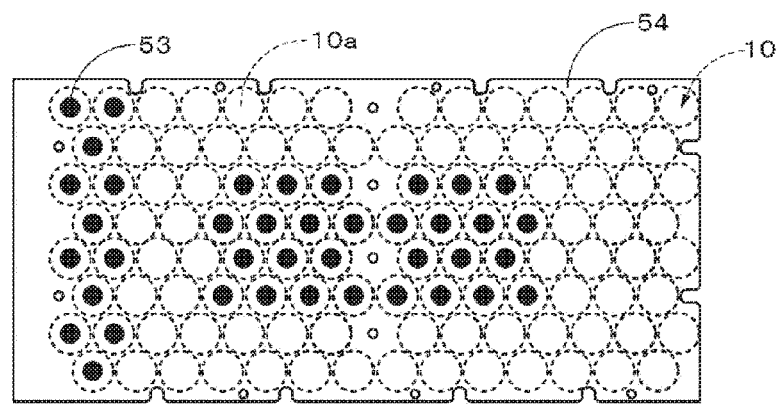
FIGS. 16A, 16B and 16C are schematic plan views illustrating exemplary distribution of the heat conductive materials.

Example 1 illustrated in FIG. 16A is distribution obtained by reducing an area of the heat conductive materials 53 arranged in two peripheral portions on the center side in the distribution of heat conductive materials 53 in the example illustrated in FIG. 15. In Example 1, the number of heat conductive materials 53 arranged is more reduced in the two peripheral portions on the center side than the number of those in the distribution of the heat conductive materials 53 in the example illustrated in FIG. 15. In Example 1, the heat conductive materials 53 are arranged such that distribution is dense in the center portion and sparser in the peripheral portions than in the center portion. Furthermore, in Example 1, the heat conductive materials 53 are arranged such that distribution is denser on the front end side of the peripheral portions near the heat generating members than in other peripheral portions excluding the front end side of the peripheral portions in a manner similar to the example illustrated in FIG. 15.

Figure 16B:
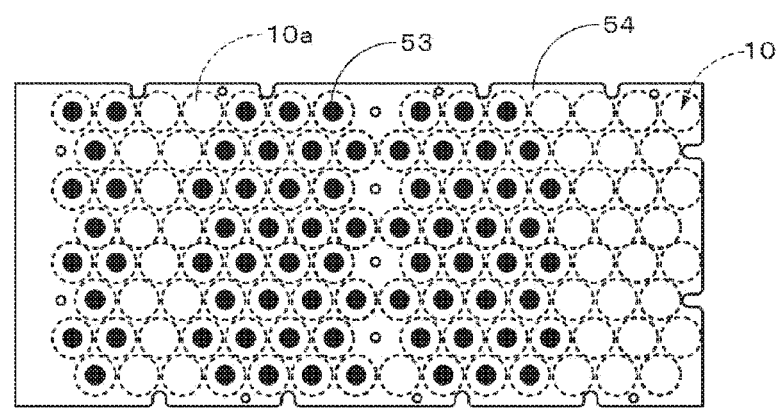

Example 2 illustrated in FIG. 16B is distribution obtained by increasing an area of heat conductive materials 53 arranged in the two peripheral portions on the center side in the distribution of heat conductive materials 53 in the example illustrated in FIG. 15. In Example 2, the number of heat conductive materials 53 arranged is more increased in the two peripheral portions on the center side than the number of those in the distribution of the heat conductive materials 53 in the example illustrated in FIG. 15. In Example 1, the heat conductive materials 53 are arranged such that distribution is dense in the center portion and sparser in the peripheral portions than in the center portion. Furthermore, in Example 2, the heat conductive materials 53 are arranged such that distribution is denser on the front end side of the peripheral portions near the heat generating members and the center side of the peripheral portions than in other peripheral portions excluding the mentioned regions.

Figure 16C:
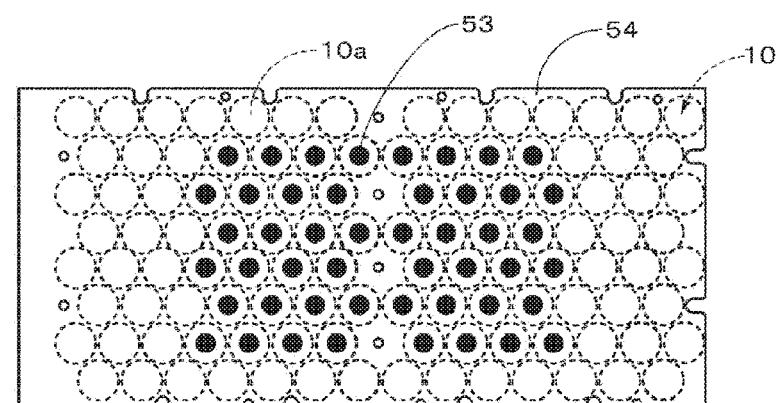

Example 3 illustrated in FIG. 16C is distribution obtained by reducing an area of the heat conductive materials 53 in the peripheral portions on the front end side in the distribution of heat conductive materials 53 in the example illustrated in FIG. 15. In Example 3, the number of heat conductive materials 53 arranged is more reduced in the peripheral portions on the front end side than the number of those in the distribution of the heat conductive materials 53 in the example illustrated in FIG. 15. In Example 3, the heat conductive materials 53 are arranged such that distribution is dense in the center portion and sparser in the peripheral portions than in the center portion.

[Test Examples]

Test described below were performed in order to verify effects of a heat conductive material.

(Sample 1)

As illustrated in FIG. 15, a power storage module illustrated in FIGS. 1 and 2 was manufactured, in which a heat conductive material 53 (heat conductive sheets each having substantially a circular flat surface shape (flexible silicon sheet (FSL250BH) of Denka Company Limited (DENKA)) was arranged.

(Sample 2)

Figure 17:
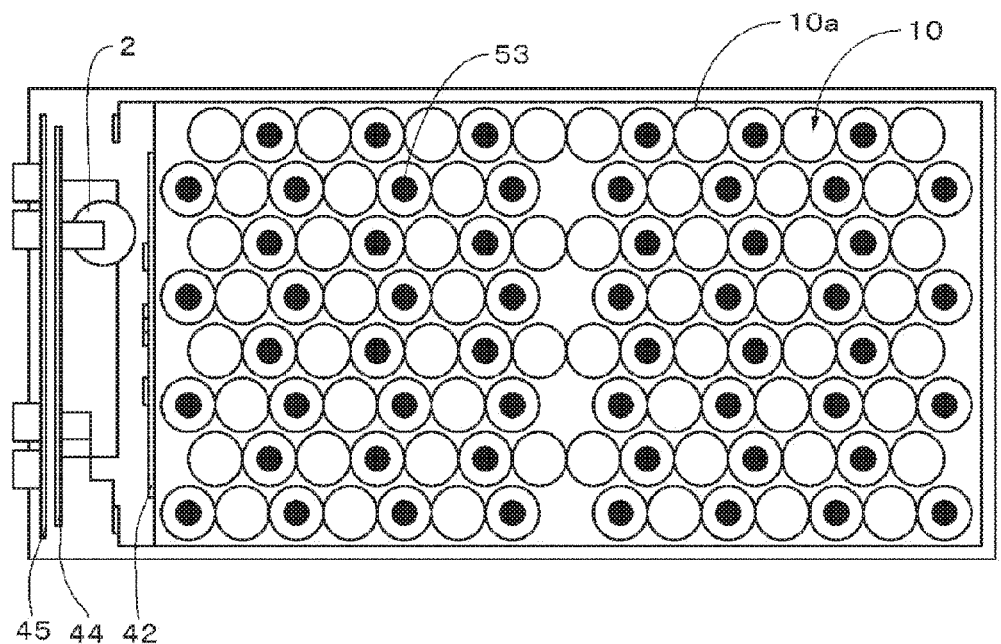
FIG. 17 is a schematic plan view illustrating exemplary distribution of the heat conductive materials.

A power storage module similar to Sample 1 was manufactured except that arrangement of the heat conductive materials 53 was changed to arrangement illustrated in FIG. 17. Note that Sample 2 is an example in which the heat conductive materials 53 are not arranged on an end surface of a battery block group such that an area occupying ratio occupied by the heat conductive materials 53 is unevenly located in the center portion.

(Sample 3)

A power storage module similar to Sample 1 was manufactured except that no heat conductive material 53 is arranged.

[Test]

Tests 1 and 2 described below were performed for Sample 1 and Sample 2. In Tests 1 and 2, note that four measurement points were prepared on one surface side and the other surface side (total eight measurement points) that faces the one surface side of a stacked body including a battery unit 51 and a battery unit 52 on which heat conductive materials 53 were arranged.

(Test 1)

Consecutive charging/discharging test was performed at the rate of 0.6 C in a temperature environment of 45° C. A maximal temperature from among temperatures of the eight temperature measurement points in the power storage module and variation of maximal temperatures (standard deviation) at the respective measurement points were obtained. Incidentally, 1 C is a current value capable of completely discharging or charging theoretical capacity in one hour, and 0.6 C is a current value capable of completely discharging or charging the theoretical capacity in about 1.7 hours.

(Test 2)

As for Sample 1 and Sample 2, a capacity retention rate in the power storage module ten years later in the case of performing consecutive charging/discharging at the rate of 0.6 C in the temperature environment of 45° C. was acquired by simulation.

Test results are provided in Table 1.

TABLE 1

| | ARRANGE-MENT OF HEAT CONDUCTIVE SHEET | TEST 1 | | TEST 2 *CAPACITY RETENTION RATE |
|---|---|---|---|---|
| | | *MAXIMAL TEMPERATURE | VARIATION (STANDARD DEVIATION) | |
| SAMPLE 1 | FIG. 15 | −2.6° C. | 0.3° C. | +5.3% |
| SAMPLE 2 | FIG. 17 | −2.2° C. | 0.6° C. | +4.5% |
| SAMPLE 3 | N/A | — | 0.9° C. | — |

*MAXIMAL TEMPERATURES AND CAPACITY RETENTION RATES OF SAMPLE 1 AND SAMPLE 2 ARE DIFFERENCES FROM REFERENCE VALUES (VALUES OF SAMPLE 3)

[Evaluation]

As shown in Table 1, it could be confirmed that temperature variation caused by a difference of a position inside the battery block group 10 could be reduced and a heat radiation characteristic could be improved by arranging the heat conductive materials 53 as illustrated in FIG. 15. It could be confirmed that temperature increase could be suppressed by efficiently radiating heat by arranging the heat conductive materials 53 as illustrated in FIG. 15, and a service life of the power storage module could be extended as a result thereof.

(Modified Example 1)

The example of the power storage module according to the first embodiment is not limited to the one in which insulating materials and heat conductive materials are arranged on both of two bottom surface sides of battery units stacked in two stages. For example, an example of the power storage module according to the first embodiment may have a structure in which an insulating material and a heat conductive material are arranged on only one side of the two bottom surfaces of the battery units stacked in the two stages.

(Modified Example 2)

Additionally, the example of the power storage module according to the first embodiment is not limited to the one in which distribution of heat conductive materials arranged on both of the two bottom surface sides of the battery units stacked in the two stages is the same distribution. For example, arrangement may be different between distribution of heat conductive materials on one side of the two bottom surface sides of the battery units stacked in the two stages and distribution of heat conductive materials on the other side thereof.

Specifically, for example, two distribution different from each other may be selected from among distribution of heat conductive materials 53 in the above-described example and other examples (Examples 1 to 3), and the heat conductive materials 53 may be arranged in accordance with one of the selected distribution on one side (upper side) of the two bottom surfaces of the battery units stacked in the two stages, and the heat conductive materials 53 may be arranged in accordance with the other distribution on the other side (lower side) of the mentioned two bottom surfaces. More specifically, for example, the heat conductive materials 53 may be arranged on the upper side of the battery unit in accordance with distribution of the heat conductive materials 53 in Example 3 (distribution illustrated in FIG. 16C), and the heat conductive materials may be arranged on the lower side in accordance with the distribution of the heat conductive materials 53 in the above-described example (distribution illustrated in FIG. 15).

Additionally, a total arrangement area of the heat conductive materials 53 on one of the two bottom surface sides of the battery units stacked in the two stages may be the same or may be different from a total arrangement area of the heat conductive materials on the other one. The total arrangement area of the heat conductive materials 53 can be changed on the basis of change of a place where heat tends to be accumulated according to a placement surface at the time of placing the power storage modules.

(Modified Example 3)

Figure 18:
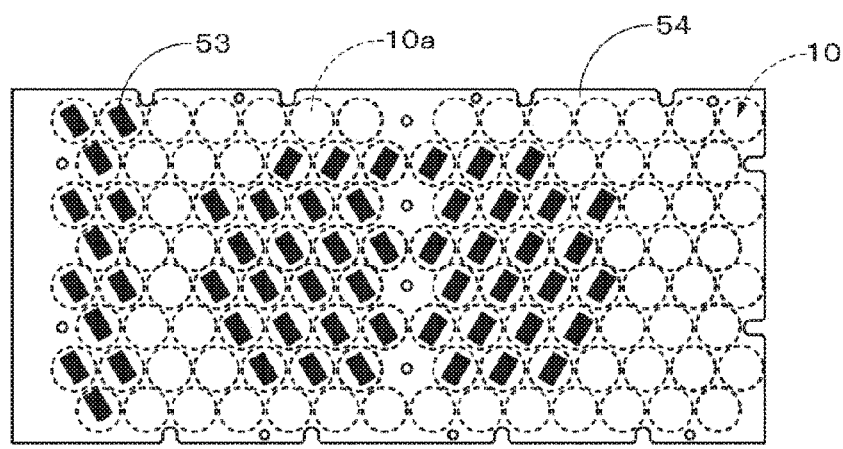
FIG. 18 is a schematic plan view illustrating exemplary distribution of the heat conductive materials.

The example of the power storage module according to the first embodiment is not limited to the one in which a flat surface shape of a heat conductive material is substantially a circular shape, and for example, an oblong shape like an ellipse, or a rectangular shape may also be applied. FIG. 18 illustrates an example of using a heat conductive material having a rectangular shape. The rectangular heat conductive material 53 is preferable because material cutting is easier.

The example of the power storage module according to the first embodiment is not limited to the one in which the heat conductive materials are formed of a plurality of members individually interspersed, and the heat conductive material may be a member having a clearance, such as a heat conductive material including a main portion arranged at a position corresponding to a terminal surface of a battery cell 10a and a coupling portion adapted to couple main portions. The main portion of the heat conductive material may have a structure, for example, similar to one of the above-described plurality of interspersed members.

(Modified Example 4)

The example of the power storage module according to the first embodiment is not limited to the one in which an area of heat conductive material 53 is smaller than an area of the flat surface shape of the end surface of the battery cell 10a. For example, the heat conductive material 53 may have an area larger than an area of the flat surface shape of the end surface of one battery cell 10a or the end surfaces of two or more battery cells 10a.

Figure 19A:
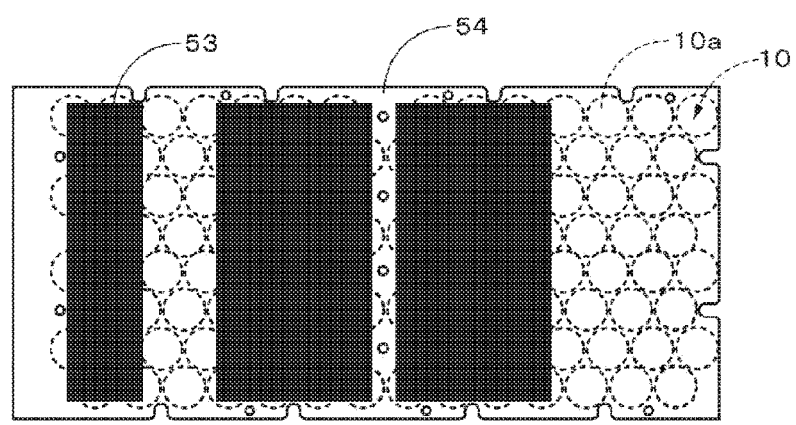
FIGS. 19A and 19B are schematic plan views illustrating exemplary distribution of the heat conductive materials.
Figure 19B:
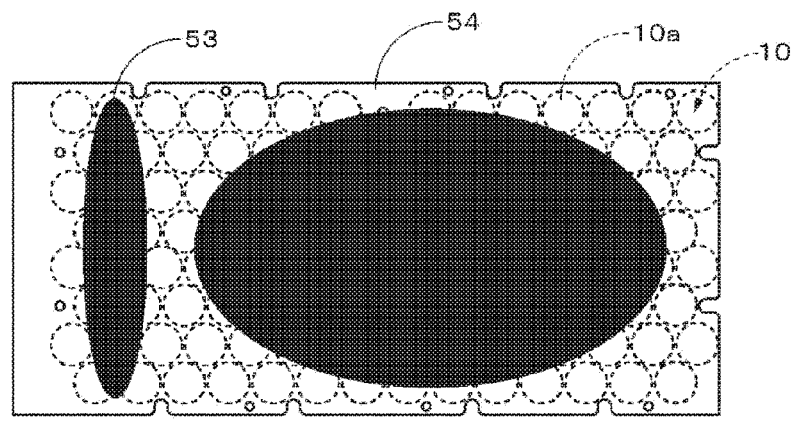

Examples of such a heat conductive material 53 may be a rectangular one having an area larger than a total area of the flat surface shapes of the end surfaces of a plurality of battery cells 10a illustrated in FIG. 19A, and an oblong one having an area larger than a total area of the flat surface shapes of the end surfaces of a plurality of battery cells 10a illustrated in FIG. 19B. The shape of the heat conductive material 53 is not limited to the rectangular shape, oblong shape, or the like, and various kinds of shapes can be adopted. Note that when a state in which two or more heat conductive materials 53 are arranged apart from each other is included in an interspersed state. A state illustrated in FIG. 19A in which three heat conductive materials 53 are arranged apart from each other, and a state illustrated in FIG. 19B in which two heat conductive materials 53 are arranged apart from each other are included in the interspersed state, and these heat conductive materials 53 correspond to a plurality of interspersed members.

(Modified Example 5)

Figure 20A:
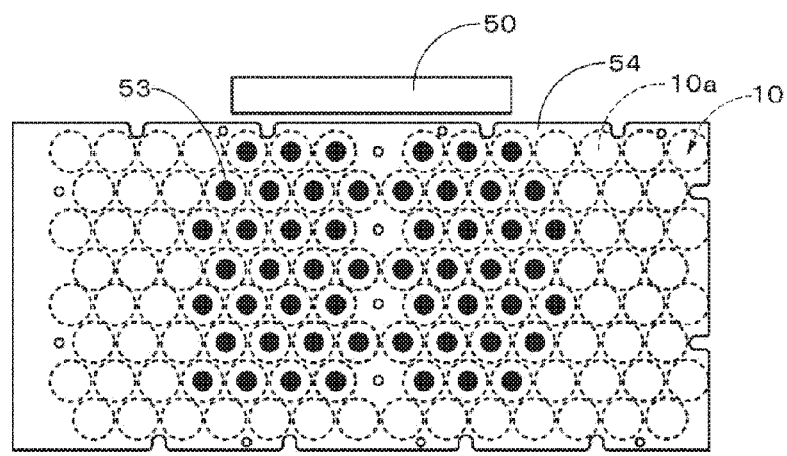
FIGS. 20A and 20B are schematic plan views illustrating exemplary distribution of the heat conductive materials.
Figure 20B:
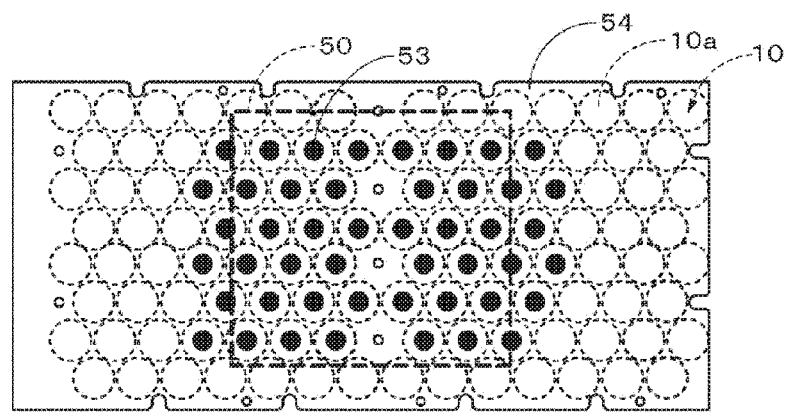

In the example of the power storage module according to the first embodiment, a position of a substrate is not limited and the substrate may be arranged at various positions. For example, as illustrated in FIG. 20A, a substrate 50 may also be arranged beside a battery block group 10. As illustrated in FIG. 20B, the substrate 50 may also be arranged above a battery block group 10. Incidentally, the substrate 50 in the drawings illustrates one substrate, but the substrate 50 may also be at least one of the plurality of substrates (the above-described sub-substrate 42, output terminal substrate 44, external communication substrate 45, and the like).

In this case, it is preferable to change distribution of the heat conductive materials 53 in accordance with the position of the substrate 50. For example, in the case of having substrate arrangement illustrated in FIG. 20A, it is preferable that the heat conductive materials 53 be arranged more densely in a peripheral portion near the substrate 50 than in other peripheral portions. Note that the peripheral portion near the substrate 50 refers to a peripheral portion located at a position facing the substrate 50 in the plan view. For example, in the case of having substrate arrangement illustrated in FIG. 20B, it is preferable that the heat conductive materials 53 be arranged more densely in a region corresponding to an arrangement surface of the substrate 50 than in other regions.

2. Second Embodiment

An exemplary structure of a power storage module according to a second embodiment of the present technology will be described with reference to the drawings.

Figure 21:
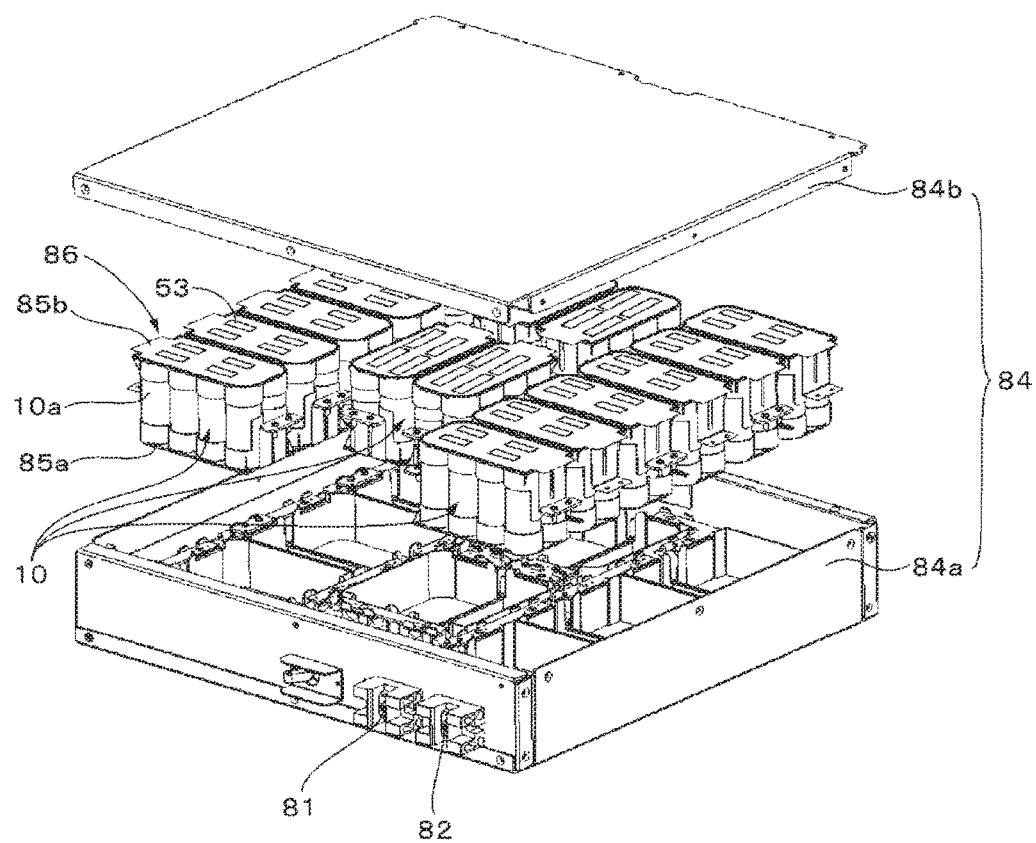
FIG. 21 is an exploded perspective view illustrating another exemplary structure of the power storage module.

As illustrated in FIG. 21, an external positive terminal 81 and an external negative terminal 82 to perform charging/discharging for the power storage module are provided on a front surface of the power storage module in a manner adjacent to each other.

An outer case 84 is formed of an outer lower case 84a and an outer upper case 84b. The power storage module includes: the outer case 84 as a housing; a plurality of battery modules 86 housed inside the outer case 84; battery blocks B1 to B16 (battery block group 10) formed of a plurality of battery cells 10a included in each of the battery modules 86; and a heat conductive material 53 arranged on at least on one of an upper side (side of the outer upper case 84b) and a lower side (side of the outer lower case 84a) of the battery block group 10. Note that the heat conductive material 53 is arranged on the upper side of the battery block group 10 in the example illustrated in FIG. 21.

The battery module 86 is a unit that houses, in a battery holder, a battery block including a plurality of battery cells 10a (eight battery cells in the example of FIG. 21) connected in parallel, and includes a positive metal plate 85a and a negative metal plate 85b which are connecting terminal portions joined to terminal surfaces of the battery cells 10a.

Similarly to a first embodiment, a plurality of heat conductive materials 53 is interposed between an inner surface of the outer cases 84 and the positive metal plate 85a or the negative metal plate 85b which is the connecting terminal portion. Specifically, the plurality of heat conductive materials 53 arranged on the upper side of the battery block group 10 is interposed between the outer upper case 84b and the connecting terminal portion (positive metal plate 85a or negative metal plate 85b) joined to the terminal surfaces of the battery cells 10a on the upper side of the battery block group 10. These heat conductive materials 53 contact both of the connecting terminal portion (positive metal plate 85a or negative metal plate 85b) and the outer upper case 84b.

Incidentally, in the case where the power storage module includes heat conductive materials 53 arranged on the lower side of the battery block group 10, the plurality of heat conductive materials 53 arranged on the lower side of the battery block group 10 is interposed between the outer lower case 84a and the connecting terminal portion (positive metal plate 85a or negative metal plate 85b) joined to terminal surfaces of the battery cells 10a on the lower side of the battery block group 10. These heat conductive materials 53 contact both of the connecting terminal portion (positive metal plate 85a or negative metal plate 85b) and the outer lower case 84a.

The outer case 84 includes: the outer lower case 84a to house the battery modules 86; and the outer upper case 84b to cover the outer lower case 84a housing the plurality of battery modules 86. The outer lower case 84a has a structure in which the plurality of battery modules 86 can be detached.

(Distribution of Heat Conductive Materials)

Figure 22:
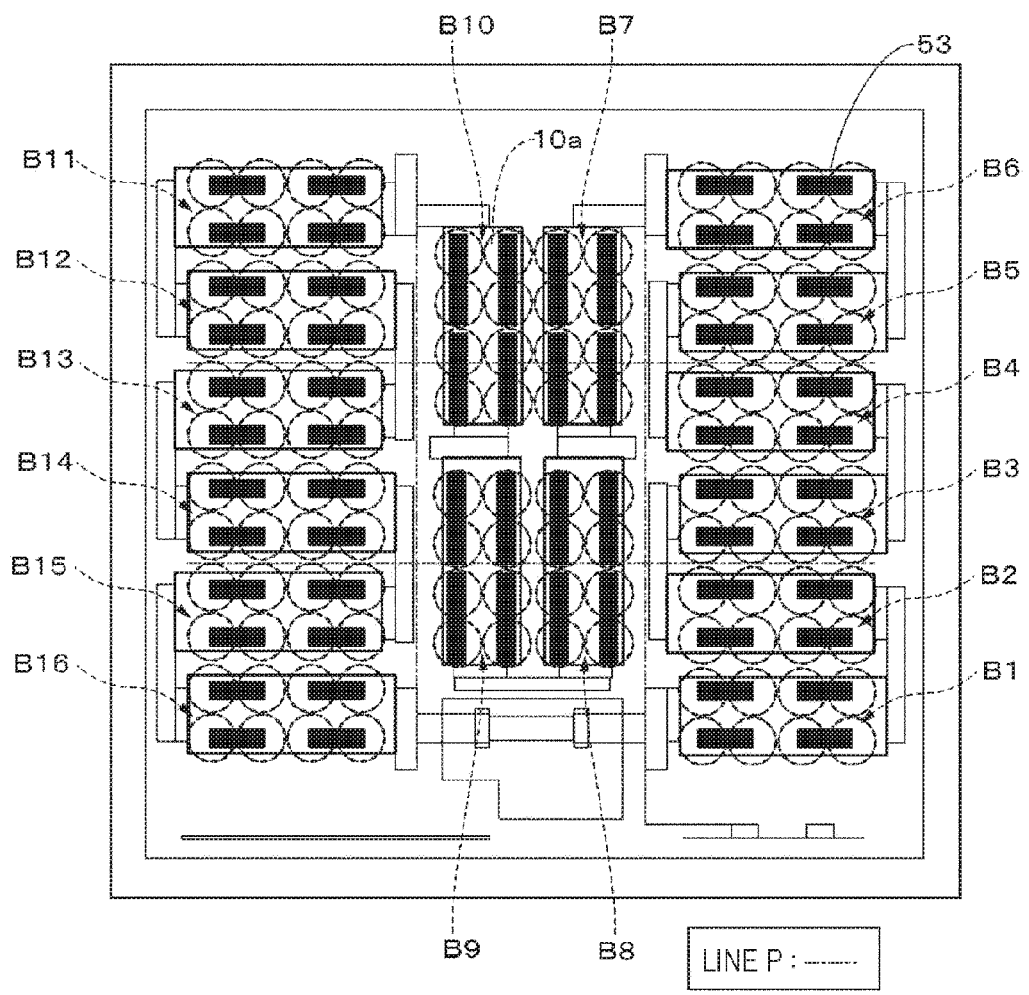
FIG. 22 is a schematic plan view illustrating exemplary distribution of the heat conductive materials.

FIG. 22 is a schematic plan view illustrating exemplary distribution of heat conductive materials 53 on end surfaces in a battery block group in a plan view from a normal line direction of an arrangement surface of the heat conductive materials 53. Incidentally, as indicated by dot-and-dash lines P in FIG. 22, a region surrounded by an outermost peripheral edge of a battery block group formed of battery blocks B1 to B16 is equally divided into three in a vertical direction and then equally divided into three in a horizontal direction, thereby obtaining nine regions in a manner similar to the first embodiment. A center region out of the nine regions will be referred to as a center portion, and regions surrounding the center portion will be referred to as peripheral portions.

In the example illustrated in FIG. 22, the heat conductive materials 53 are arranged so as to have uneven distribution in which an area occupying ratio occupied by the heat conductive materials 53 is larger in the center portion. For example, the heat conductive materials 53 are arranged densely in the center portion and the heat conductive materials 53 are arranged more sparsely in the peripheral portions than in the center portion.

Such uneven distribution is achieved by, for example, arranging heat conductive materials 53 having different sizes. In the example illustrated in FIG. 22, two kinds of rectangular heat conductive materials 53 having different sizes are used. In addition, the heat conductive materials 53 each having a smaller area are arranged in positions corresponding to the four battery blocks B7 to B10 in the center, and the heat conductive materials 53 each having a larger area are arranged in the twelve battery blocks B1 to B6 and B11 to B16 arranged on the left and right sides of the four battery blocks B7 to B10 in the center. Thus, the heat conductive materials 53 have the above-described uneven distribution.

According to the second embodiment, effects similar to the first embodiment are provided. In other words, according to the present technology, local temperature increase in a battery block group 10 can be suppressed by locally improving a heat radiation property by arranging heat conductive materials 53 densely in a region likely to have a high temperature. Consequently, a service life of the power storage module can be extended. Additionally, since minimum number of heat conductive materials 53 can be arranged, it is possible to provide a contribution in reducing a weight of the power storage module and also possible to provide a contribution in reducing a weight of a power storage system including a large number of power storage modules.

[Test Examples]

(Sample 4)

As illustrated in FIG. 22, a power storage module illustrated in FIG. 22 was manufactured, in which two kinds of heat conductive materials 53 having different sizes (heat conductive sheets each having a rectangular flat surface shape (flexible silicon sheet (FSL250BH) of Denka Company Limited (DENKA)) were arranged. Note that a smaller heat conductive material 53 has an area obtained by reducing an area of a larger heat conductive material 53 by 30%.

(Sample 5)

Figure 23:
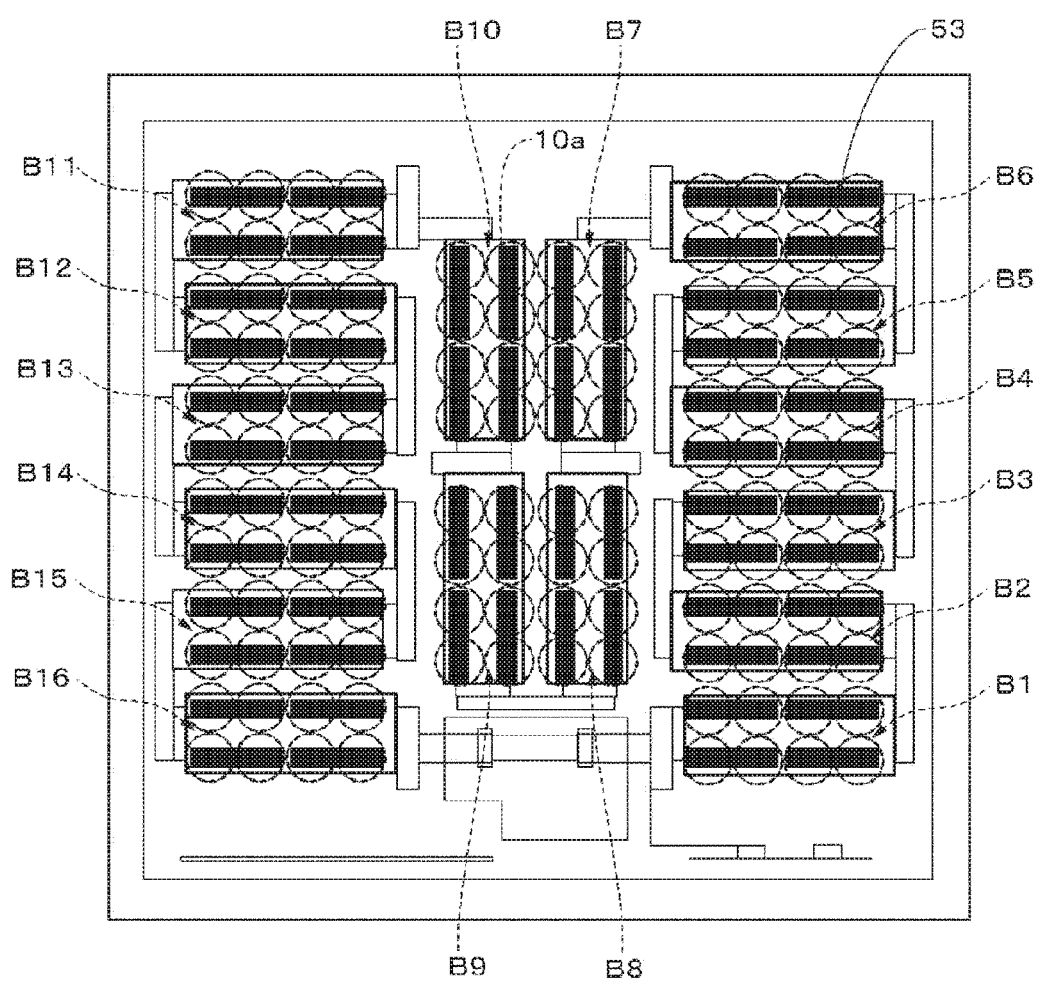
FIG. 23 is a schematic plan view illustrating exemplary distribution of the heat conductive materials.

As illustrated in FIG. 23, a power storage module illustrated in FIG. 23 was manufactured, in which heat conductive materials 53 (heat conductive sheets each having a rectangular flat surface shape (flexible silicon sheet (FSL250BH) of Denka Company Limited (DENKA)) were arranged. Note that the heat conductive material 53 illustrated in FIG. 23 has a size same as that of the larger heat conductive material 53 in Sample 4. Additionally, Sample 5 does not have uneven distribution of the heat conductive material 53 in which an area occupying ratio occupied by heat conductive materials 53 is larger in a center portion on an end surface of battery block group in the plan view.

(Test 3)

As for Sample 4 and Sample 5, discharging is performed in the following conditions. At this point, a maximal temperature and a minimal temperature out of temperature at sixteen temperature measurement points were obtained by setting one measurement point in each battery block, and a different between the maximal temperature and the minimal temperature is acquired ($\Delta Tmax-\Delta Tmin$ [° C.]). Consequently, evaluation is made on temperature variation in battery cells caused by a difference of a position inside the power storage module.

(Test 3-1)

Discharging was performed at an environment temperature 23° C. with discharge current 24 A (1 C) and discharge termination voltage 32.0 V.

(Test 3-2)

Discharging was performed at an environment temperature 23° C. with discharge current 50 A and discharge termination voltage 32.0 V.

(Test 3-3)

Discharging was performed at an environment temperature 40° C. with discharge current 50 A and discharge termination voltage 32.0 V.

Test results are provided in Table 2.

TABLE 2

| | ARRANGEMENT OF HEAT CONDUCTIVE SHEET | $\Delta Tmax - \Delta Tmin$ [° C.] | | |
|---|---|---|---|---|
| | | TEST 3-1 | TEST 3-2 | TEST 3-3 |
| SAMPLE 4 | FIG. 22 | 0.7 | 1.3 | 2.2 |
| SAMPLE 5 | FIG. 23 | 1.1 | 1.7 | 2.6 |

[Evaluation]

As shown in Table 2, values of $\Delta Tmax-\Delta Tmin$ [° C.] in Sample 4 is smaller than those in Sample 5. In other words, there is an effect of excellently suppressing temperature variation in Sample 4 by arranging the heat conductive materials 53 as illustrated in FIG. 22. In Sample 4, the effect of suppressing temperature variation better than the effect in Sample 5 can be obtained by efficiently radiating heat despite the fact that a total area of the heat conductive materials 53 is smaller than that in Sample 5.

3. Other Embodiments

The present technology is not limited to above-described embodiments of the present technology, and various kinds of modifications and applications can be made within a range not departing from the gist of the present technology.

For example, the numerical values, structures, shapes, materials, raw materials, manufacturing processes, and the like exemplified in the above-described embodiments and Examples are merely examples, and different values, structures, shapes, materials, raw materials, manufacturing processes, and the like may also be used as necessary. For example, the plurality of projecting portions and the plurality of holes may be one projecting portion and one hole.

Additionally, the structures, methods, processes, shapes, materials, numerical values, and the like exemplified in the above-described embodiments and Examples can be mutually combined without departing from the spirit of the present technology.

According to the above-described first embodiment, the example of having two battery units housed in the outer case 20 has been described, but the number of the battery units housed in the outer case 20 is not limited to two. For example, the number of battery units housed in the outer case may be one or may also be three or more. For example, the power storage modules may be housed in the outer case 20 in a manner horizontally stacked in three or more stages in a vertical arrangement state in which the upper surface portion of the top case 61a is oriented in the horizontal direction. Also, for example, the power storage modules may be housed in the outer case 20 in a manner horizontally stacked in three or more stages in a lateral arrangement state in which the upper surface of the top case 61a is oriented in the vertical direction. Additionally, the bottom surface portion of the bottom case 61b may have a structure similar to the upper surface portion of the top case 61a. Furthermore, it may be possible to have a structure in which the two battery units 51 and 52 horizontally stacked in the two or more stages are housed in the outer case 20 while the upper surface portion of the top case 61a and the bottom surface portion of the bottom case 61b are placed so as to be oriented in the vertical direction. Also, for example, a joining terminal portion may have a structure in which terminal surfaces of three or more battery rows are joined.

Figure 24:
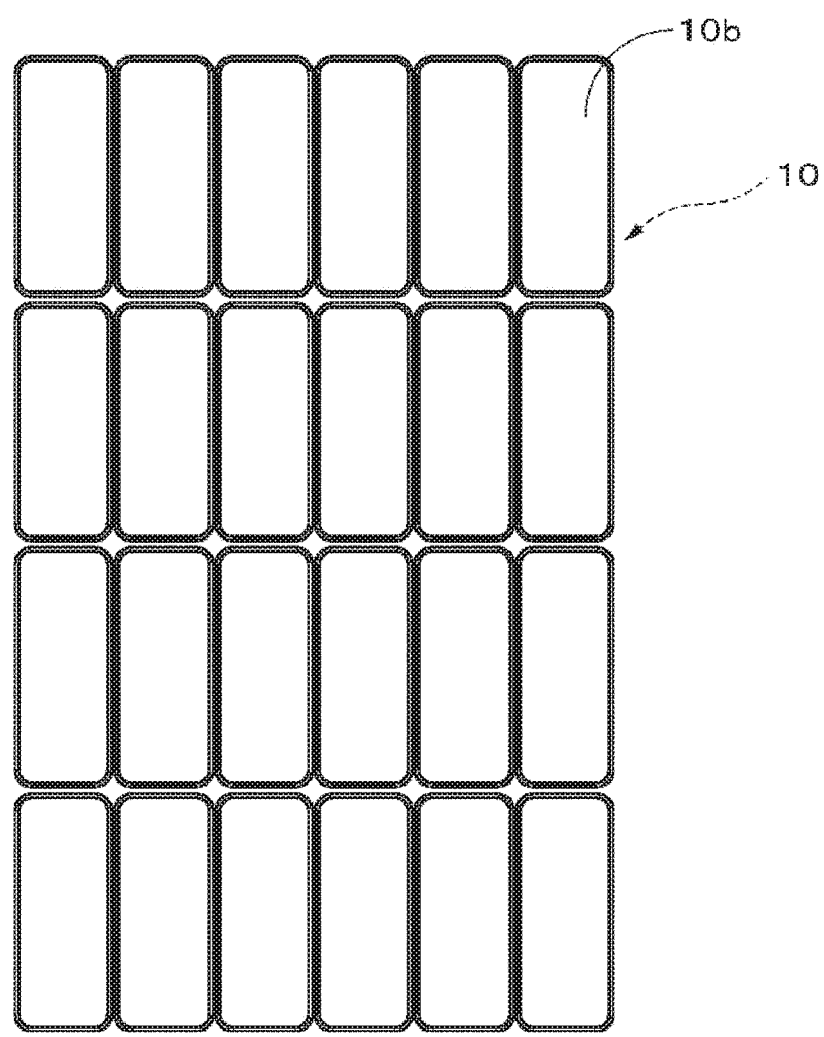
FIG. 24 is a schematic plan view illustrating an exemplary battery block using square battery cells.

For a battery cell, another battery structure such as a square type or a laminate film type may also be applied, and a battery block group may be formed of such battery cells. FIG. 24 illustrates a battery block group using square battery cells. This battery block group 10 is formed of twenty four square battery cells 10b having connection of 2 in parallel× 12 in series.

Note that the power storage module of the present technology may also have the following configurations.

[1]

A power storage module including:

a battery block group including a plurality of battery cells;

a connecting terminal portion joined to terminal surfaces of the plurality of battery cells; and a heat conductive material arranged on the connecting terminal portion in a contacting manner, in which the heat conductive material includes at least any member of a plurality of interspersed members or a member having a clearance, and the heat conductive materials are distributed more densely in a center portion of a region surrounded by an outermost peripheral edge of the battery block group than in peripheral portions surrounding the center portion in a plan view from a normal line direction of an arrangement surface of the heat conductive materials.

[2]

The power storage module recited in [1], in which the heat conductive materials are distributed more densely in part of peripheral portions near a heat generating member than in the peripheral portions excluding the part of the peripheral portions in the plan view from the normal line direction of the arrangement surface of the heat conductive materials.

[3]

The power storage module recited in any one of [1] to [2], in which the heat conductive materials are formed of a plurality of interspersed members, and an area of a flat surface shape of the member is smaller than an area of an end surface of the battery cell.

[4]

The power storage module recited in [3], in which one piece of the member is arranged in a position corresponding to one end surface of the battery cell.

[5]

The power storage module recited in [4], in which the member is arranged in a position corresponding to substantially a center of one end surface of the battery cell.

[6]

The power storage module recited in any one of [1] to [5], in which the heat conductive materials are more densely arranged on a center portion side than on an outer peripheral side at least on any one of a front end side of the peripheral portions, a rear end side of the peripheral portions, and a center side of the peripheral portions located between the front end side and the rear end side of the peripheral portions in the plan view from the normal line direction of the arrangement surface of the heat conductive materials.

[7]

The power storage module any one of [1] to [7], in which the heat conductive material has a sheet-like shape.

[8]

The power storage module recited in any one of [1] to [7], in which the heat conductive materials are formed of a plurality of interspersed members, and the member has a shape same as or a shape similar to a flat surface shape of a terminal surface of the battery cell.

[9]

The power storage module recited in any one of [1] to [8], including a stacked body in which battery units each including a battery case housing the battery block group, the connecting terminal portion, and the heat conductive material are stacked in two or more stages, in which the heat conductive materials are arranged on one surface side and the other surface side facing the one surface side of the stacked body.

[10]

The power storage module recited in [9], in which distribution of the heat conductive materials arranged on the one surface side differs from distribution of the heat conductive materials on the other surface side.

[11]

The power storage module recited in [9], in which the battery case has a structural body fitted into a space equivalent to substantially a size of one battery cell, and at least part of the structural body is located in the center portion in a plan view from a normal line direction of an arrangement surface of the heat conductive materials.

[12]

The power storage module recited in any one of [1] to [11], in which the battery block group has a structure in which a plurality of battery rows including the plurality of battery cells arranged in rows is arranged side by side in a direction substantially orthogonal to a row direction.

[13]

The power storage module recited in [12], in which the connecting terminal portion is joined to terminal surfaces of the plurality of battery cells constituting at least one of the battery rows, and has a longitudinal direction arranged in parallel to the row direction of the battery row.

[14]

A power storage system configured to be charged by a power generator in which the power storage module recited in any one of [1] to [13] generates power from renewable energy.

[15]

A power storage system including the power storage module recited in any one of [1] to [13] and adapted to supply power to an electronic apparatus connected to the power storage module.

[16]

An electronic apparatus adapted to receive power supply from the power storage module recited in any one of [1] to [13].

[17]

An electric vehicle including:

a converter adapted to receive power supply from a power storage module recited in any one of [1] to [13] and convert the power to drive force of a vehicle; and a control device adapted to perform information processing related to vehicle control on the basis of information related to the power storage module.

[18]

A power system in which a power information transmitting/receiving unit configured to perform transmission and receipt of signals with other apparatuses via a network is provided, and charging/discharging control for the power storage module recited in any one of [1] to [13] is performed on the basis of information received by the transmitting/receiving unit.

[19]

A power system adapted to receive power supply from the power storage module recited in any one of [1] to [13] or supply power to the power storage module from a power generator or a power network.

4. Exemplary Application

Exemplary application of a power storage module including a battery pack will be described below. Note that exemplary application of the power storage module is not limited to exemplary application described below.

The present technology is a power storage system to be charged by a power generator in which the above-described power storage module generates power from renewable energy. The present technology is a power storage system including the above-described power storage module and adapted to supply power to an electronic apparatus connected to the power storage module. The present technology is an electronic apparatus which receives power supply from the above-described power storage module. The electronic apparatus and power system are embodied as, for example, a power supply system for a house. Additionally, the present technology is embodied as a system to efficiently supply power in cooperation with an external power supply network. Furthermore, the present technology is an electric vehicle including: a converter adapted to receive power supply from the above-described power storage module and convert the power to drive force of the vehicle; and a control device adapted to perform information processing related to vehicle control on the basis of information related to the power storage module The present technology is a power system including a power information transmitting/receiving unit to perform transmission and receipt of signals with other apparatuses via a network, and adapted to control charging/discharging for the above-described power storage module on the basis of information received by the transmitting/receiving unit. The present technology is a power system which receives power supply from the above-described power storage module or supplies power from a power generator or a power network to a battery pack of the power storage module.

[Power Storage System in House as Exemplary Application]

Figure 25:
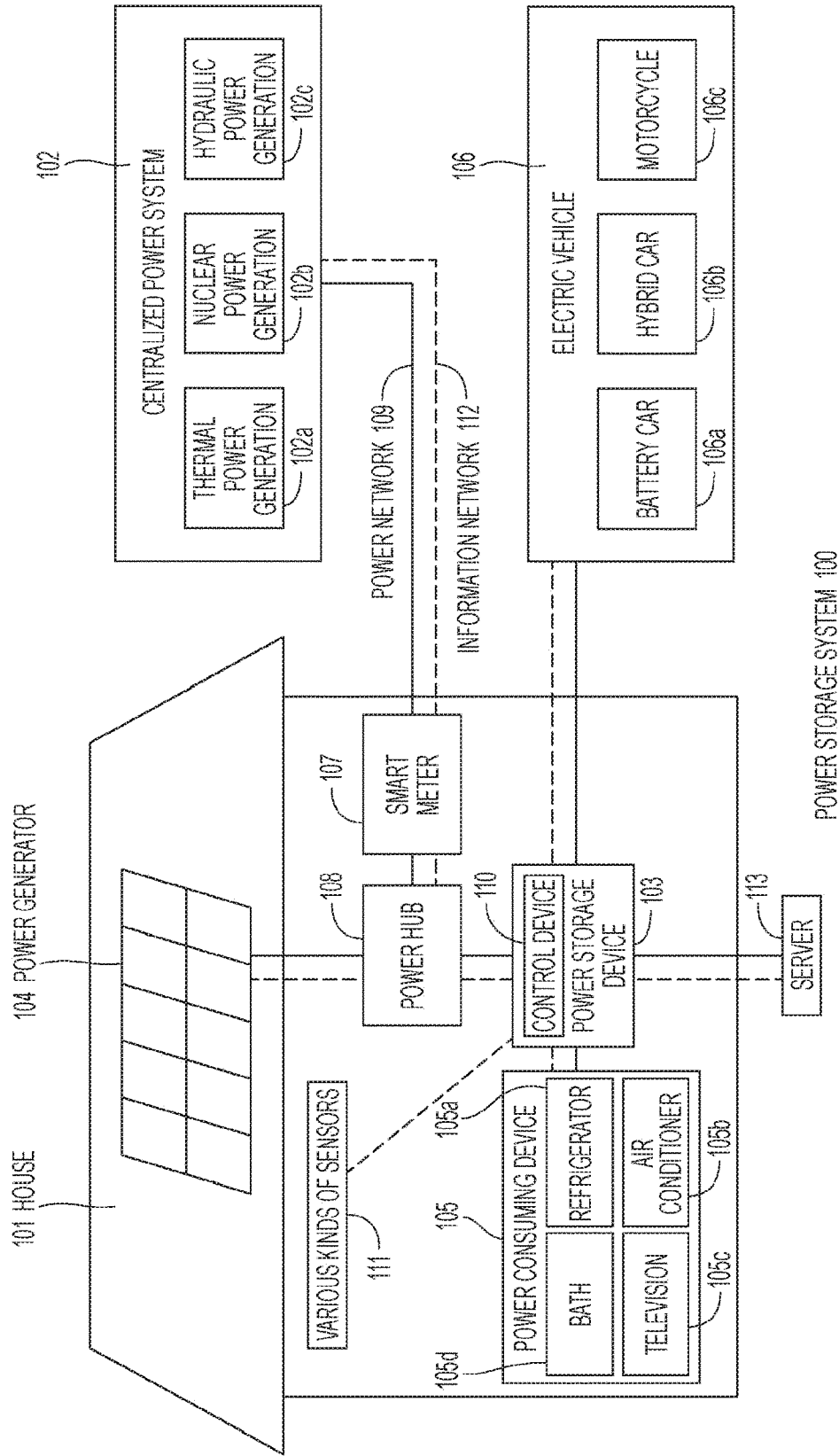
FIG. 25 is a block diagram to describe an exemplary application of the power storage module according to the present technology.

An example of applying the present technology to a power storage system for a house will be described with reference to FIG. 25. For example, power is supplied to a power storage module 103 from a centralized power system 102 of thermal power generation 102a, nuclear power generation 102b, hydraulic power generation 102c, and the like via a power network 109, an information network 112, a smart meter 107, a power hub 108, and the like in a power storage system 100 for a house 101. Additionally, power is also supplied to the power storage module 103 from an independent power source such as a power generator 104. The power supplied to the power storage module 103 is stored. Power used in the house 101 is supplied by using the power storage module 103. Not limited to the house 101, a similar power storage system can also be used for a building.

The house 101 is provided with: the power generator 104; power consuming devices 105; the power storage module 103; a control device 110 to control the respective devices; the smart meter 107; and sensors 111 to acquire various kinds of information. The respective devices are connected by the power network 109 and the information network 112. For the power generator 104, a solar cell, a fuel cell, a windmill, and the like are utilized, and generated power is supplied to the power consuming devices 105 and/or the power storage module 103. The power consumption devices 105 may include a refrigerator 105a, air conditioner 105b which is an air-conditioning device, a television 105c which is a television receiver, a bath 105d which is a bath tub, and the like. Furthermore, the power consuming devices 105 include an electric vehicle 106. The electric vehicles 106 may include a battery car 106a, a hybrid car 106b, and a motorcycle 106c. The electric vehicle 106 may also be an electric bicycle or the like.

The power storage module 103 includes a battery pack formed of a secondary battery or the like. For example, the battery pack is a lithium ion secondary battery. The above-described power storage module 1 according to the present technology can be applied to this power storage module 103. One or more power storage modules 1 can be applied. The smart meter 107 has functions to detect a used amount of commercial power and transmit the detected used amount to a power company. The power network 109 may be any one of DC power supply, AC power supply, and non-contact power supply, or may be combination a plurality thereof.

The various kinds of sensors 111 may include, for example, a human sensor, an illuminance sensor, an object detection sensor, a power consumption sensor, a vibration sensor, a contact sensor, a temperature sensor, an infrared sensor, and the like. Information acquired by the various kinds of sensors 111 is transmitted to the control device 110. Energy consumption can be minimized by grasping weather condition, human condition, and the like on the basis of the information from the sensors 111 and automatically controlling the power consuming devices 105. Additionally, the control device 110 can transmit information related to the house 101 to an external power company and the like via the Internet.

Processing such as power line branching and DC-AC conversion is performed by the power hub 108. For a communication method of the information network 112 connected to the control device 110, there may be a method of using a communication interface such as a universal asynchronous receiver transmitter (UART) and a method of utilizing a sensor network based on the wireless communication standards such as Bluetooth, ZigBee, and Wi-Fi. The Bluetooth system is applied to multimedia communication and can perform one-to-many communication. The ZigBee uses a physical layer defined by the Institute of Electrical and Electronics Engineers (IEEE) 802.15.4. IEEE802.15.4 is a name of the standard for the short-range wireless network called a personal area network (PAN) or wireless (W) PAN.

The control device 110 is connected to an external server 113. The server 113 may also be administered by any one of the house 101, a power company, and a service provider. Information transmitted or received by the server 113 may include, for example, consumption power information, life pattern information, electric rates, weather information, natural disaster information, and information related to electricity trading, The information may also be transmitted and received by a power consuming device (e.g., television receiver) inside a house but may also be transmitted and received by a device outside the house (e.g., mobile phone and the like). The information may also be displayed on an apparatus having a display function, such as a television receiver, a mobile phone, and personal digital assistants (PDA).

The control device 110 to control the respective devices includes a central processing unit (CPU), a random access memory (RAM), a read only memory (ROM), and the like, and is housed in the power storage module 103 in this example. The control device 110 is connected to the power storage module 103, power generator 104, power consuming device 105, various sensors 111, and server 113 via the information network 112, and has a function to adjust, for example, a used amount of commercial power and a power generation amount. Note that other functions such as a function to trade electricity in an electricity market may also be provided.

As described above, generated power not only in the centralized power system 102 of thermal power generation 102a, nuclear power generation 102b, hydraulic power generation 102c, and the like but also in the power generator 104 (solar power generation, wind power generation) can be stored in the power storage module 103. Therefore, even when generated power in the power generator 104 fluctuates, control can be made so as to keep a constant power amount fed to the outside or perform discharging as needed. For example, there may also be another usage in which power obtained from solar power generation is stored in the power storage module 103, additionally midnight power bought at a low electricity rate is stored in the power storage module 103 during night-time, and the power stored in the power storage module 103 is utilized during daytime which is a time zone of a high electricity rate.

Incidentally, while the description has been provided for the example of housing the control device 110 inside the power storage module 103, the control device may be housed inside the smart meter 107 or may also have an independent structure. Additionally, the power storage system 100 may also be used for a plurality of families in a multiple dwelling, or may also be used for a plurality of independent houses.

[Power Storage System in Vehicle as Exemplary Application]

Figure 26:
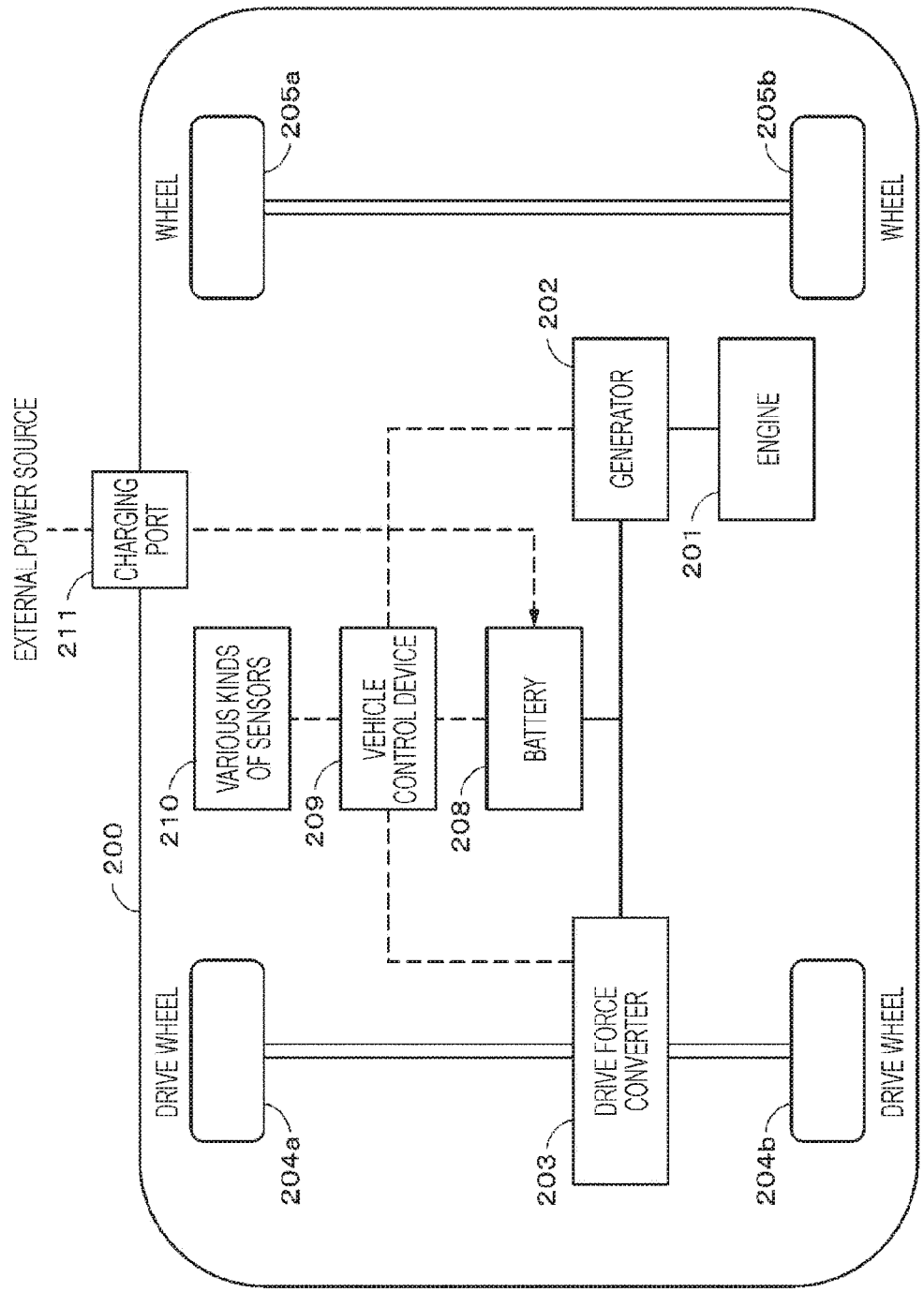
FIG. 26 is a block diagram to describe an exemplary application of the power storage module according to the present technology.

An example of applying the present technology to a power storage system for a vehicle will be described with reference to FIG. 26. FIG. 26 schematically illustrates an exemplary configuration of a hybrid vehicle adopting a series hybrid system to which the present technology is applied. The series hybrid system is a vehicle that travels by means of a power-drive force converter by using power generated by a generator operated by an engine or power obtained by once storing the generated power in a battery.

The hybrid vehicle 200 is mounted with an engine 201, a generator 202, a power-drive force converter 203, a drive wheel 204a, a drive wheel 204b, a wheel 205a, a wheel 205b, a battery 208, a vehicle control device 209, various kinds of sensors 210, and a charging port 211. The above-described power storage module 1 of the present technology is applied to the battery 208. One or more power storage modules 1 are applied.

The hybrid vehicle 200 travels using the power-drive force converter 203 as a power source. An example of the power-drive force converter 203 is a motor. The power-drive force converter 203 is actuated by power of the battery 208, and torque of the power-drive force converter 203 is transmitted to the drive wheels 204a, 204b. Incidentally, either one of an AC motor and a DC motor can be applied to the power-drive force converter 203 by using a DC-AC (direct current-alternate current) or a reverse conversion (AC-DC conversion) at a necessary place. The various kinds of sensors 210 control an engine speed and also control a position of a throttle valve not illustrated (throttle position) via the vehicle control device 209. The various kinds of sensors 210 include a speed sensor, an acceleration sensor, an engine speed sensor, and the like.

The torque of the engine 201 is transmitted to the generator 202, and power generated from the torque by the generator 202 can be stored in the battery 208.

When the hybrid vehicle decelerates by a braking mechanism not illustrated, resistance force at the time of deceleration is applied to the power-drive force converter 203 as torque, and regenerative power generated from the torque by the power-drive force converter 203 is stored in the battery 208.

When the battery 208 is connected to an external power source of the hybrid vehicle, the hybrid vehicle can receive power supply from the external power source by using the charging port 211 as a receiving port and can store the received power.

Although not illustrated, it may also be possible to include an information processing device to perform information processing related to vehicle control on the basis of information related to the secondary battery. An exemplary information processing device may be an information processing device or the like that displays a battery residual amount on the basis of information related to the battery residual amount.

Note that the above description has been provided for the example of the series hybrid vehicle which travels with the motor by using the power generated by the generator actuated by the engine and the power obtained by once storing the generated power in the battery. However, the present technology can be effectively applied to a parallel hybrid vehicle which adopts output from both of an engine and a motor as drive sources and suitably uses three kinds of systems in a switching manner. The three kinds of systems includes: travel only by the engine; travel only by the motor; and travel by the engine and the motor. Furthermore, the present technology can also be effectively applied a so-called electric vehicle which travels with drive only by a drive motor without using an engine.

REFERENCE SIGNS LIST

1 Power storage module
2 Fuse
3a Connector
3b Connector
4 External positive terminal
5 External negative terminal
7 Control unit
8 MUX
9 Current detector
9a Current detection resistor
9b Current detection amplifier
10 Battery block group
10a Battery cell
11 Conductive member
12a Plate-like projection
12b Plate-like projection
13 Support board
14 Cover
15 Temperature detector
16 MUX
17 Pulse detector
20 Outer case
20a Front surface portion
20b Rear surface portion
20c Upper surface portion
20d Lower surface portion
20e Side surface portion
20f Side surface portion 21 Protective cover
25a to b Window
26a to b Window
27 Connector
28 Electronic component
42 Sub-substrate
44 Output terminal substrate
45 External communication substrate
46 Main substrate
47a1 Bus bar
47a2 Bus bar
47a3 Bus bar
49 Substrate holding member
51 Battery unit
52 Battery unit
53 Heat conductive material
54 Insulating material
61 Battery case
61a Top case
61b Bottom case
62 Fitting portion
62a Fitting portion
62b Fitting portion
70 Hollow structural body
71 Opening
72 Hole
91, 91a to 91b Connecting terminal portion
92 Positive insulation sheet
93 Partition plate
93a Projecting portion
100 Power storage system
101 House
102 Centralized power system
102a Thermal power generation
102b Nuclear power generation
102c Hydraulic power generation
103 Power storage module
104 Power generator
105 Power consuming device
105a Refrigerator
105b Air conditioner
105c Television
105d Bath
106 Electric vehicle
106a Battery car
106b Hybrid car
106c Motorcycle
107 Smart meter
108 Power hub
109 Power network
110 Control device
111 Sensor
112 Information network
113 Server
200 Hybrid vehicle
201 Engine
202 Generator
203 Power-drive force converter
204a, 204b Drive wheel
205a, 205b Wheel
208 Battery
209 Vehicle control device
210 Sensor
211 Charging port
B1 to B16 Battery block
COM1 Communication unit
CTN1 Module controller
ICNT Control box
ISC1 Insulation unit
L1 to L8 Battery row
MO Power storage module

The invention claimed is:

1. A power storage module, comprising:
a battery block group including a plurality of battery cells;
a connecting terminal portion joined to terminal surfaces of the plurality of battery cells; and
a heat conductive material arranged on the connecting terminal portion in a contacting manner, wherein
the heat conductive material includes at least any member of a plurality of interspersed members or a member having a clearance, and
the heat conductive material is distributed more densely in a center portion of a region surrounded by an outermost peripheral edge of the battery block group than in peripheral portions surrounding the center portion in a plan view from a normal line direction of an arrangement surface of the heat conductive material.

2. The power storage module according to claim 1, wherein the heat conductive material is distributed more densely in a part of peripheral portions near a heat generating member than in peripheral portions excluding the part of the peripheral portions in the plan view from the normal line direction of the arrangement surface of the heat conductive material.

3. The power storage module according to claim 1, wherein an area of a flat surface shape of a member of a plurality of interspersed members is smaller than an area of an end surface of a battery cell of the plurality of battery cells.

4. The power storage module according to claim 3, wherein one piece of the member is arranged in a position corresponding to one end surface of the battery cell.

5. The power storage module according to claim 4, wherein the member is arranged in a position corresponding to substantially a center of the one end surface of the battery cell.

6. The power storage module according to claim 1, wherein the heat conductive material is more densely arranged on a center portion side than on an outer peripheral side at least on any one of a front end side of the peripheral portions, a rear end side of the peripheral portions, and a center side of the peripheral portions located between the front end side and the rear end side of the peripheral portions in the plan view from the normal line direction of the arrangement surface of the heat conductive materials.

7. The power storage module according to claim 1, wherein the heat conductive material has a sheet-like shape.

8. The power storage module according to claim 1, wherein a member of the plurality of interspersed members has a shape same as or a shape similar to a flat surface shape of a terminal surface of a battery cell of the plurality of battery cells.

9. The power storage module according to claim 1, including a stacked body in which battery units each including a battery case housing the battery block group, the connecting terminal portion, and the heat conductive material are stacked in two or more stages,
wherein the heat conductive material is arranged on one surface side and another surface side facing the one surface side of the stacked body.

10. The power storage module according to claim 9, wherein distribution of the heat conductive material arranged on the one surface side differs from distribution of the heat conductive material on the other surface side.

11. The power storage module according to claim 9, wherein
the battery case has a structural body fitted into a space equivalent to substantially a size of one battery cell, and
at least part of the structural body is located in the center portion in the plan view from the normal line direction of the arrangement surface of the heat conductive material.

12. The power storage module according to claim 1, wherein the battery block group has a structure in which a plurality of battery rows including the plurality of battery cells arranged in rows is arranged side by side in a direction substantially orthogonal to a row direction.

13. The power storage module according to claim 12, wherein the connecting terminal portion is joined to the terminal surfaces of the plurality of battery cells constituting at least one of the plurality of battery rows, and has a longitudinal direction arranged in parallel to the row direction of the battery row.

14. A power system, comprising:
a battery block group including a plurality of battery cells;
a connecting terminal portion joined to terminal surfaces of the plurality of battery cells;
a heat conductive material arranged on the connecting terminal portion in a contacting manner, wherein
the heat conductive material includes at least any member of a plurality of interspersed members or a member having a clearance, and
the heat conductive material is distributed more densely in a center portion of a region surrounded by an outermost peripheral edge of the battery block group than in peripheral portions surrounding the center portion in a plan view from a normal line direction of an arrangement surface of the heat conductive material; and
a power information transmitting/receiving unit configured to:
perform transmission and receipt of signals with other apparatuses via a network, and
charging/discharging control for the power storage module, on the basis of information received by the transmitting/receiving unit.

15. A power system, comprising:
circuitry configured to receive power supply from a power storage module or supply power to the power storage module from a power generator or a power network, wherein the power storage module comprises:
a battery block group including a plurality of battery cells;
a connecting terminal portion joined to terminal surfaces of the plurality of battery cells;
a heat conductive material arranged on the connecting terminal portion in a contacting manner, wherein
the heat conductive material includes at least any member of a plurality of interspersed members or a member having a clearance, and
the heat conductive material is distributed more densely in a center portion of a region surrounded by an outermost peripheral edge of the battery block group than in peripheral portions surrounding the center portion in a plan view from a normal line direction of an arrangement surface of the heat conductive material.

* * * * *